(12) United States Patent
Lindsey et al.

(10) Patent No.: US 12,725,122 B1
(45) Date of Patent: Sep. 1, 2026

(54) APPARATUS AND METHOD FOR IMPROVING RESOURCE DISTRIBUTION BY FACILITATING INTERCONNECTED MODULES

(71) Applicant: Power Forward, Inc., Marshfield, MA (US)

(72) Inventors: Dana Lindsey, Boston, MA (US); Reuben Fletcher, Boston, MA (US)

(73) Assignee: Power Forward, Inc., Marshfield, MA (US)

( * ) Notice: Subject to any disclaimer, the term of this patent is extended or adjusted under 35 U.S.C. 154(b) by 0 days.

(21) Appl. No.: 19/296,252

(22) Filed: Aug. 11, 2025

(51) Int. Cl.
*G06Q 10/087* (2023.01)

(52) U.S. Cl.
CPC .................................. *G06Q 10/087* (2013.01)

(58) Field of Classification Search
CPC .................................................... G06Q 10/087
See application file for complete search history.

(56) References Cited

U.S. PATENT DOCUMENTS 12,200,167 B1 * 1/2025 Mecca .................... H04L 51/02
12,242,945 B1 * 3/2025 Everest .................. G06N 20/00
12,314,739 B1 * 5/2025 Browder ................. G06F 9/451
12,443,421 B1 * 10/2025 Browder ................. G06F 9/542
2012/0101972 A1 * 4/2012 Cao ......................... A23P 10/00 706/47
2015/0379449 A1 * 12/2015 Gopinath ............. G06Q 10/087 705/7.25
2019/0259043 A1 * 8/2019 Koneri ................. G06Q 10/087
2021/0092121 A1 3/2021 Blais et al.
2021/0224736 A1 * 7/2021 Abrahamson ........ G06Q 20/203
2022/0383757 A1 * 12/2022 Tavshikar ................ G08G 5/26
2023/0119088 A1 * 4/2023 Dohrn ................ G06Q 10/0875 705/334
2024/0062166 A1 * 2/2024 List ...................... G06Q 10/087
2024/0119407 A1 * 4/2024 Reczek .............. G06Q 10/0838
2024/0320622 A1 * 9/2024 Fisher .................... G06V 20/52
2024/0369979 A1 * 11/2024 Smith .................. G05B 13/042
2025/0045304 A1 * 2/2025 Quatro ................... G06N 20/00
2025/0181982 A1 * 6/2025 Everest .................. G06N 20/00

(Continued)

FOREIGN PATENT DOCUMENTS

CA 120278674 A 7/2025
CN 110930137 A 3/2020
WO 2005122679 A2 12/2005

*Primary Examiner* — Michael Jared Walker
(74) *Attorney, Agent, or Firm* — CALDWELL LLC

(57) ABSTRACT

An apparatus and method for improving resource distribution by facilitating interconnected modules are disclosed. The apparatus includes at least a processor, and a memory containing instructions configuring the at least a processor to receive input data, preprocess the input data to extract at least an input feature of the input data using a feature extraction process, classify each data element of the input data into a plurality of interconnected modules as a function of the at least an input feature, generate, using the plurality of interconnected modules, output data as a function of the classified data element of the input data, generate a user interface including a digital representation of the output data, wherein generating the user interface includes executing a distribution datum as a function of the output data, and update an input data profile as a function of the execution of the distribution datum.

20 Claims, 8 Drawing Sheets

(56) References Cited

U.S. PATENT DOCUMENTS

| | | | | |
|---|---|---|---|---|
| 2025/0217199 | A1* | 7/2025 | Smith | G06F 18/2415 |
| 2025/0265299 | A1* | 8/2025 | Sahoo | G06Q 30/0641 |
| 2025/0285016 | A1* | 9/2025 | Smith | G06N 7/01 |

* cited by examiner

APPARATUS AND METHOD FOR IMPROVING RESOURCE DISTRIBUTION BY FACILITATING INTERCONNECTED MODULES

FIELD OF THE INVENTION

The present invention generally relates to the field of data processing. In particular, the present invention is directed to an apparatus and method for improving resource distribution by facilitating interconnected modules.

BACKGROUND

In many data-driven systems, relevant information is not centralized but instead arrives from multiple, heterogeneous data sources at varying times and in different formats. Traditional architectures are often designed to ingest data from a single or uniform source, requiring synchronized input streams or extensive pre-processing before meaningful operations can be performed. Without technical mechanisms for systematically handling asynchronous data ingestion, associating temporally disjoint data entries, or dynamically resolving incomplete records, such systems are unable to maintain accurate, up-to-date representations of user status or eligibility conditions. Multisource data processing introduces the technical challenge of associating independently received data elements with a persistent user-specific profile while maintaining semantic coherence, temporal ordering, and module-level accessibility. Existing solutions typically lack granularity and adaptability, resulting in static, incomplete, or fragmented internal representations. There is therefore a need for a system that enables continuous, profile-centric aggregation of data across multiple sources.

SUMMARY OF THE DISCLOSURE

In some aspects, the techniques described herein relate to an apparatus for improving resource distribution by facilitating interconnected modules, the apparatus including at least a processor, and a memory communicatively connected to the at least a processor, wherein the memory contains instructions configuring the at least a processor to receive input data related to a resource distribution, wherein receiving the input data includes receiving at least a first portion of the input data at a first interval from a first data source and receiving at least a second portion of the input data at a second interval from a second data source, preprocess the input data to extract at least an input feature of the input data using a feature extraction process, classify each data element of the input data into a plurality of interconnected modules as a function of the at least an input feature, wherein classifying each data element of the input data includes generating an input data profile, wherein the input data profile includes a set of data elements of the input data associated with a resource receiver, generate, using the plurality of interconnected modules, output data as a function of the classified data element of the input data, generate a user interface including a digital representation of the output data, wherein generating the user interface includes executing a distribution datum as a function of the output data, and update the input data profile as a function of the execution of the distribution datum.

In some aspects, the techniques described herein relate to a method for improving resource distribution by facilitating interconnected modules, the method including receiving, using at least a processor, input data related to a resource distribution, wherein receiving the input data includes receiving at least a first portion of the input data at a first interval from a first data source and receiving at least a second portion of the input data at a second interval from a second data source, preprocessing, using the at least a processor, the input data to extract at least an input feature of the input data using a feature extraction process, classifying, using the at least a processor, each data element of the input data into a plurality of interconnected modules as a function of the at least an input feature, wherein classifying each data element of the input data includes generating an input data profile, wherein the input data profile includes a set of data elements of the input data associated with a resource receiver, generating, using the at least a processor and the plurality of interconnected modules, output data as a function of the classified data element of the input data, generating, using the at least a processor, a user interface including a digital representation of the output data, wherein generating the user interface includes executing a distribution datum as a function of the output data, and updating, using the at least a processor, the input data profile as a function of the execution of the distribution datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
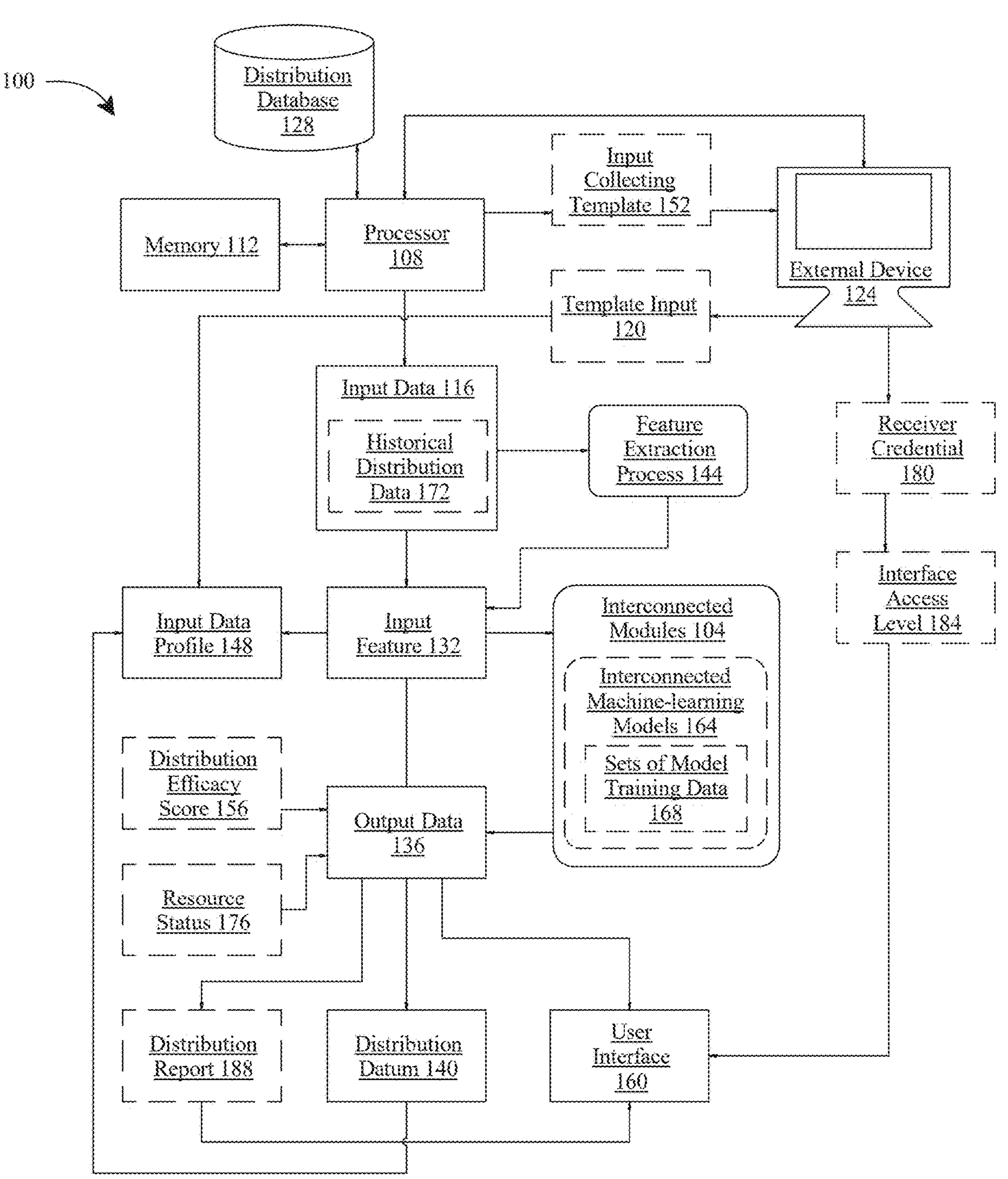
FIG. 1 illustrates a block diagram of an exemplary apparatus for improving resource distribution by facilitating interconnected modules.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for improving resource distribution by facilitating interconnected modules, the apparatus including at least a processor, and a memory communicatively connected to the at least a processor, wherein the memory contains instructions configuring the at least a processor to receive input data related to a resource distribution, wherein receiving the input data includes receiving at least a first portion of the input data at a first interval from a first data source and receiving at least a second portion of the input data at a second interval from a second data source, preprocess the input data to extract at least an input feature of the input data using a feature extraction process, classify each data element of the input data into a plurality of interconnected modules as a function of the at least an input feature, wherein classifying each data element of the input data includes generating an input data profile, wherein the input data profile includes a set of data elements of the input data associated with a resource receiver, generate, using the plurality of interconnected modules, output data as a function of the classified data element of the input data, generate a user interface including a digital representation of the output data, wherein generating the user interface includes executing a distribution datum as a function of the output data, and update the input data profile as a function of the execution of the distribution datum.

Aspects of the present disclosure can be used to create a comprehensive cloud-based platform that enables organizations to efficiently manage, track, and distribute funding to individuals and organizations. The system provides tools for financial tracking, invoice generation, and data organization for funding recipients, while also offering inventory management, user organization, recipient tracking, survey distribution, and data analysis capabilities.

Aspects of the present disclosure allow for managing funding distribution. Previous methods for managing funding distribution typically rely on disparate systems that handle different aspects of the process separately. Organizations often use general accounting software that lacks specialized features for funding distribution management, spreadsheet programs for tracking recipients and payments with limited automation, separate survey tools that are not integrated with recipient data, email or paper-based systems for communications with funding recipients, standalone inventory management systems and multiple data storage solutions across different platforms. These existing approaches have significant limitations, including data fragmentation across multiple systems leading to inefficiency and errors, lack of integrated survey and form distribution capabilities, limited ability for funding recipients to track their own funding, poor inventory management integration, difficult access for administrators and users across different devices, manual processes for generating and tracking invoices, limited cloud accessibility and mobile compatibility.

Compared to prior existing technology, aspects of the present disclosure address multiple technical limitations in distributed data systems by enabling modular, real-time integration of heterogeneous data sources within a unified processing architecture. The system eliminates data fragmentation by programmatically linking numerical, operational, and recipient-specific data into a single, structured database accessible through interconnected modules. Automated data ingestion, classification, and output generation reduce the reliance on manual data reconciliation processes and mitigate the latency associated with asynchronous data updates. The apparatus further improves technical data collection workflows by enabling dynamic generation and execution of structured input collecting templates, thereby supporting continuous and context-specific updates to recipient profiles. Through its cloud-based deployment and device-agnostic interface rendering, the system ensures synchronized access to live system state across distributed endpoints. Additionally, by associating input features with modular logic and applying machine-learning-based predictive modeling, the system supports traceable, data-driven distribution decisions while simultaneously updating internal state representations without requiring user intervention. These technical improvements collectively resolve inefficiencies in data interoperability, system modularity, and real-time analytics within resource distribution environments.

Exemplary embodiments illustrating aspects of the present disclosure are described below in the context of several specific examples.

Referring now to FIG. 1, an exemplary embodiment of apparatus 100 for improving resource distribution by facilitating interconnected modules 104 is illustrated. The interconnected modules 104 are described in detail below. For the purposes of this disclosure, "resource distribution" is a process of allocating, assigning, or transferring one or more types of resources. For the purposes of this disclosure, a "resource" is any tangible or intangible asset, service, or benefit. As a non-limiting example, resource may include financial assets such as funds or subsidies, physical goods such as equipment, supplies, or personal items, access to services such as training programs, healthcare, or counseling, digital entitlements such as software access or online platform credentials, or infrastructural allocations such as facility space or personnel support. For example, and without limitation, a resource may include scholarship funds allocated to individuals participating in recovery or empowerment programs, therapeutic or service animals such as comfort dogs assigned to residents in sober living homes, housing accommodations in certified recovery facilities including silver homes, access to job placement or vocational support services, data tracking tools used to monitor behavioral progress or relapse events, and educational opportunities provided in collaboration with academic institutions. In some embodiments, resources may be distributed from an administering entity to one or more resource receivers. For the purposes of this disclosure, an "administering entity" is any organization, institution, agency, or authorized body responsible for managing, allocating, monitoring, or overseeing the distribution of resources to designated resource receivers. In some cases, administering entity may operate in a public, private, or non-profit capacity. For example, and without limitation, administering entity may include governmental bodies, educational institutions, healthcare providers, community organizations, recovery service providers, or funding agencies. As a non-limiting example, administering entity may include a user. For the purposes of this disclosure, a "user" is any individual or entity that uses an apparatus 100. For the purposes of this disclosure, a "resource receiver" is any individual, group, organization, or entity that can receive, access, utilize, or benefit from one or more resources. As a non-limiting example, resource receiver may include a scholarship applicant, a program participant, a resident of a recovery or housing facility, a patient in a healthcare or therapeutic setting, or a client of a vocational, educational, or support service. For example, and without limitation, resource receiver may include an individual undergoing substance use recovery.

With continued reference to FIG. 1, apparatus 100 may include circuitry such as without limitation a processor 108 communicatively connected to a memory 112. For instance, circuitry may include and/or be included in a computing device. Processor 108 may include any computing device as described in this disclosure, including without limitation a microcontroller, microprocessor, digital signal processor (DSP) and/or system on a chip (SoC) as described in this disclosure. Processor 108 may include, be included in, and/or communicate with a mobile device such as a mobile telephone or smartphone. Processor 108 may include a single computing device operating independently, or may include two or more computing device operating in concert, in parallel, sequentially or the like; two or more computing devices may be included together in a single computing device or in two or more computing devices. Processor 108 may interface or communicate with one or more additional devices as described below in further detail via a network interface device. Network interface device may be utilized for connecting processor 108 to one or more of a variety of networks, and one or more devices. Examples of a network interface device include, but are not limited to, a network interface card (e.g., a mobile network interface card, an LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 108 may include but is not limited to, for example, a computing device or cluster of computing devices in a first location and a second computing device or cluster of computing devices in a second location. Processor 108 may include one or more computing devices dedicated to data storage, security, distribution of traffic for load balancing, and the like. Processor 108 may distribute one or more computing tasks as described below across a plurality of computing devices of computing device, which may operate in parallel, in series, redundantly, or in any other manner used for distribution of tasks or memory between computing devices. Processor 108 may be implemented, as a non-limiting example, using a "shared nothing" architecture.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 108 may be designed and/or configured to perform any method, method step, or sequence of method steps in any embodiment described in this disclosure, in any order and with any degree of repetition. For instance, processor 108 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory 112 contains instructions configuring processor 108 to receive input data 116 related to a resource distribution. For the purposes of this disclosure, "input data" is information related to a resource distribution received by an apparatus from one or more external or internal sources. In some cases, input data 116 may include numerical, categorical, textual, or temporal data elements. In some cases, input data 116 may originate from user-submitted forms, administrative records, external databases, survey responses (e.g., template input 120), and the like. As a non-limiting example, input data 116 may include information related to a resource receiver's demographic characteristics, program enrollment status, historical participation outcomes, financial needs, health indicators, housing arrangements, compliance history, survey inputs, and reported activities. In some embodiments, input data 116 may include historical resource distribution data. For the purposes of this disclosure, "historical resource distribution data" is previously recorded information relating to past instances of resource allocation, usage, and recipient outcomes. In some cases, historical resource distribution data may include operational history of how specific resources were distributed, to whom, under what conditions, and with what observable results. As a non-limiting example, historical resource distribution data may include timestamps of prior resource disbursements, identifiers of resource receivers, quantities and types of resources allocated, compliance status during and after distribution, survey responses collected post-distribution, behavioral or clinical outcomes, and follow-up results such as program completion, relapse rates, or secondary eligibility determinations. Historical resource distribution data may include data related to the administering entity's execution of prior resource plans, including errors, delays, or adjustments. In some cases, input data 116 may include resource data. As a non-limiting example, resource data may include inventory records of available physical resources, financial resource availability, program capacity constraints, facility-level metrics, administrative scheduling parameters, and resource utilization histories. In some cases, input data 116 may include image data. As a non-limiting example, image data may include scanned identification documents, photographs of distributed physical resources (e.g., equipment or facility conditions), magnetic resonance imaging (MRI) scan outputs associated with pre- and post-intervention assessments or resource distribution, or image-based submissions used for compliance monitoring or behavioral evaluation. In a non-limiting example, MRI scan of blood flow may be analyzed or used to identify recovery status of resource receiver.

With continued reference to FIG. 1, receiving the input data 116 includes receiving at least a first portion of the input data 116 at a first interval from a first data source and receiving at least a second portion of the input data 116 at a second interval from a second data source. This configuration may enable apparatus 100 to process data arriving asynchronously from heterogeneous sources, such as administrative record systems, user-submitted forms, automated sensor feeds, or third-party service providers. In some cases, input data 116 may vary in structure, fidelity, and temporal cadence, with some elements arriving in real time and others delivered in batch at periodic intervals. For the purposes of this disclosure, a "data source" is any internal or external origin from which input data is collected. In some cases, data source may be a software system, a hardware device, a network-accessible repository, or a user-operated interface that produces, transmits, or provides access to data relevant to a resource distribution process. Data sources may vary in modality, frequency, reliability, and format, and may include both automated and human-driven systems. As a non-limiting example, data source may include electronic forms completed by resource receivers, administrative dashboards used by staff members, external databases operated by third-party entities, mobile applications used for real-time reporting, sensors associated with physical resource tracking, cloud storage services, or application processing interface (APIs) that expose relevant program data. In some cases, data source may deliver structured, semi-structured, or unstructured data and may transmit data in real time, in periodic batches, or in response to specific triggers or events. In some embodiments, each data source may be associated with a specific data type or function, such as financial records, survey responses, inventory logs, recipient updates, or compliance tracking information. For the purposes of this disclosure, a "first data source" is a data source from which a first portion of input data is collected. For the purposes of this disclosure, a "second data source" is a data source from which a second portion of input data is collected. For example, and without limitation, first data source may include a client-facing mobile application through which a resource receiver submits real-time updates, such as weekly survey responses, behavioral check-ins, or self-reported employment activities. For example, and without limitation, second data source may include an administrative back-office system operated by an administering entity, which may transmit structured data related to financial disbursements, inventory levels, or facility compliance metrics.

With continued reference to FIG. 1, for the purposes of this disclosure, an "interval" refers to timing or frequency at which data is received from a particular data source. In some cases, interval may be expressed in terms of regular or irregular temporal spacing. As a non-limiting example, interval may include continuous, periodic, event-driven, or ad hoc reception. For the purposes of this disclosure, a "first interval" refers to a specific timing associated with a receipt of a first portion of input data from a first data source. For the purposes of this disclosure, a "second interval" refers to a specific timing associated with a receipt of a second portion of input data from a second data source. In a non-limiting example, first interval may be a high-frequency or continuous data stream, such as real-time telemetry from a user application or live updates from a client portal. Continuing the non-limiting example, second interval may represent scheduled or batch transmissions, such as weekly compliance reports, periodic inventory updates, or delayed responses to survey prompts. For example, and without limitation, processor 108 may receive application data of at least a first portion of input data 116 continuously (first interval) and template data of the at least a second portion of the input data 116 periodically (second interval). As a non-limiting example, periodical interval may include once a week, twice a month, or the like. The use of distinct intervals can allow apparatus 100 to process and align asynchronously received data elements without requiring temporal uniformity across data sources. By accommodating multiple intervals across heterogeneous data streams, apparatus 100 can be capable of maintaining a responsive, real-time representation of the operational state, and can improve temporal accuracy in the generation and execution of data.

With continued reference to FIG. 1, in some embodiments, a portion of input data 116 received from different data sources may vary. In a non-limiting example, portion of input data 116 may include application data and template data. For the purposes of this disclosure, "application data" is information indicating interaction initiated by a resource receiver, applying for resource distribution. As a non-limiting example, application data may include personal identifying information, demographic details, financial disclosures, medical or behavioral history, program preferences, prior assistance received, supporting documentation, and signed attestations of a plurality of resource receivers. In some cases, application data may include categorical selections, numerical entries, text responses, and uploaded files such as income verification forms or identification documents. In some embodiments, application data may be received in bulk during onboarding. In other embodiments, application data may be received incrementally or continuously over time through ongoing interactions with a user interface. For the purposes of this disclosure, "template data" is information indicating an interaction of a resource receiver with an input collecting template. As a non-limiting example, template data may include binary selections, numeric ratings, textual entries, or media files that correspond to the questions or prompts presented in the template. As a non-limiting example, template data may include metadata such as timestamps, recipient identifiers, or completion status flags. In some cases, processor 108 may receive template data at periodic intervals (e.g., weekly or monthly). For example, and without limitation, a first portion of input data 116 may include recipient-specific updates submitted through a mobile interface, such as responses to a weekly progress survey. In a non-limiting example, first portion of input data 116 may include binary indicators of program participation (e.g., "Did you attend required sessions this week?"), free-text descriptions of job-seeking efforts, numerical ratings of mental well-being, or uploaded images of housing conditions. For example, and without limitation, second portion of input data 116 may include administrative data uploaded by staff or retrieved from institutional systems at periodic intervals. In a non-limiting example, second portion of input data 116 may include scheduled financial disbursement logs, facility inventory reports, historical program metrics, or summary-level recipient compliance records.

With continued reference to FIG. 1, in some embodiments, processor 108 may be configured to detect and remove duplicate data elements as part of its input data 116 preprocessing or classification stages. In some embodiments, processor 108 may compare data elements for exact matches in structured fields such as timestamps, unique identifiers, or numerical values. In some cases, processor 108 may apply machine-learning-based feature extraction to encode the data into vector representations, embeddings. In some cases, embeddings may be generated using natural language processing models or domain-specific encoders trained to preserve semantic relationships between data points. Once embeddings are generated, processor 108 may calculate a distance metric between a newly received data element and existing elements in a data profile described below. As a non-limiting example, distance metric may include cosine similarity or Euclidean distance. In a non-limiting example, if the distance falls below a defined similarity threshold, processor 108 may classify the new input as a duplicate. In some cases, duplicate may be deleted, merged with existing data, or tagged for lower weighting in downstream processes.

With continued reference to FIG. 1, in some embodiments, when processor 108 receives input data 116 from multiple data sources, it may encounter conflicting or overlapping data elements. In some cases, if there are data conflict from two data sources, processor 108 may use source prioritization rules based on data type, reliability, recency, or user role. In a non-limiting example, processor 108 may prioritize one data source over another based on a predefined trust model. For example, and without limitation, data originating from a verified administrative system may override data submitted through a user-facing interface due to higher assumed reliability. In another non-limiting example, processor 108 may apply temporal prioritization, in which more recent data supersedes older data, regardless of origin, under the assumption that it more accurately reflects the current operational context. For example, and without limitation, data originating from a verified administrative system may override data submitted through a user-facing form, or more recent data may be preferred over earlier entries regardless of source. In some cases, processor 108 may apply data-type-based resolution strategies. For example, and without limitation, for numerical data, processor 108 may select a value with the least deviation from an established historical trend associated with a resource receiver. For example, and without limitation, for categorical or free-text data (e.g., textual data), processor 108 may compute semantic similarity across overlapping inputs using embedding-based vector representations. In some cases, processor 108 may flag the conflict and preserve both versions for administrative review if the discrepancy exceeds a defined threshold or involves critical eligibility criteria.

With continued reference to FIG. 1, in some embodiments, processor 108 may receive input data 116 from an external device 124. Data source may include external device 124. For the purposes of this disclosure, an "external device" is any device a user or a resource receiver use to input data. As a non-limiting example, external device 124 may include a laptop, desktop, tablet, mobile phone, smart phone, smart watch, kiosk, screen, smart headset, or things of the like. In some embodiments, external device 124 may include an interface configured to receive inputs from a user (e.g., administering entity) and/or resource receiver. In some embodiments, a user and/or resource receiver may manually input any data into apparatus 100 using external device 124. In some embodiments, a user and/or resource receiver may have a capability to process, store or transmit any information independently.

With continued reference to FIG. 1, in some embodiments, processor 108 may receive input data 116 from a distribution database 128. Data source may include distribution database 128. As used in this disclosure, a "distribution database" is a data structure configured to store data associated with resource distribution. As a non-limiting example, distribution database 128 may store input data 116, input feature 132, output data 136, distribution datum 140, and the like. In one or more embodiments, distribution database 128 may include inputted or calculated information and datum related to a resource distribution. In some embodiments, a datum history may be stored in distribution database 128. As a non-limiting example, the datum history may include real-time and/or previous inputted data related to a resource distribution. As a non-limiting example, distribution database 128 may include instructions from a user, who may be an expert user, a past user in embodiments disclosed herein, or the like, where the instructions may include examples of the data related to resource distribution.

With continued reference to FIG. 1, in some embodiments, processor 108 may be communicatively connected with distribution database 128. For example, and without limitation, in some cases, distribution database 128 may be local to processor 108. In another example, and without limitation, distribution database 128 may be remote to processor 108 and communicative with processor 108 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 108 connects directly, dynamically, and non-hierarchically to as many other computing devices as possible. A "network topology" as used in this disclosure is an arrangement of elements of a communication network.

With continued reference to FIG. 1, in some embodiments, distribution database 128 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, input data 116 may be derived from a web crawler. Data source may include a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 108 may generate web crawler to scrape input data 116 from user's website. The web crawler may be seeded and/or trained with a reputable website to begin the search. Web crawler may be generated by processor 108. In some embodiments, web crawler may be trained with information received from user through a user interface. In some embodiments, web crawler may be configured to generate a web query. A web query may include search criteria received from user. For example, user may submit a plurality of websites for web crawler to search to input data 116. Additionally, web crawler function may be configured to search for and/or detect one or more data patterns. A "data pattern" as used in this disclosure is any repeating forms of information. In some embodiments, web crawler may be configured to determine the relevancy of a data pattern. Relevancy may be determined by a relevancy score. A relevancy score may be automatically generated by processor 108, received from a machine learning model, and/or received from user. In some embodiments, a relevancy score may include a range of numerical values that may correspond to a relevancy strength of data received from a web crawler function. As a non-limiting example, a web crawler function may search the Internet for input data 116 related to resource distribution.

With continued reference to FIG. 1, memory 112 contains instructions configuring processor 108 to preprocess input data 116 to extract at least an input feature 132 of the input data 116 using a feature extraction process 144. For the purposes of this disclosure, "input feature" is a data attribute, variable, or extracted component of input data. As a non-limiting example, input feature 132 may include categorical labels (e.g., program type, resource type, recipient role), numerical indicators (e.g., compliance scores, usage frequencies, efficacy scores), temporal markers (e.g., duration in program, time since last update), derived variables (e.g., risk classification, eligibility tier, predicted resource demand), keywords, and the like. For example, and without limitation, input feature 132 may include keywords such as "job search," "relapse," and the like. For example, and without limitation, input feature 132 may include keywords or labels including "scholarship," "funding request," "unused balance," "stipend," "reimbursement," "payment schedule," "early withdrawal," "over disbursement," "financial aid," "budget limit," "funding eligibility," and "allocation threshold." For example, and without limitation, input feature 132 may include keywords or labels including "inventory," "equipment," "comfort dog," "bed assignment," "housing unit," "supply delivery," "device request," "lost item," "item check-out," "asset tracking," and the like. In some embodiments, input feature 132 may be stored in distribution database 128 and processor 108 may retrieve input feature 132 from distribution database 128. In some embodiments, user may manually input at least an input feature 132.

With continued reference to FIG. 1, for the purposes of this disclosure, a "feature extraction process" is a procedure to identify, derive, and structure relevant attributes from input data. As a non-limiting example, feature extraction process 144 may include natural language processing, signal transformation, statistical summarization, time-series decomposition, pattern recognition, and metadata parsing. In some cases, feature extraction process 144 may operate on both structured and unstructured data sources. In some cases, extracted features may be encoded into numerical or categorical representations that are compatible with predictive models (e.g., interconnected modules 104, and the like), including machine learning or rule-based systems.

Still referring to FIG. 1, in some embodiments, input data 116, input feature 132 may be converted into a different form. Data formats may be converted in a variety of ways, such as without limitation, using a speech to text function or using optical character recognition. In some embodiments, input data 116 may be converted into a different form such that it is in a form appropriate for input into a function. As a non-limiting example, a language model may only accept inputs in a particular format, and input data 116 may be converted into that format such that it may be effectively input into such a language model.

Still referring to FIG. 1, data may also be altered such that it retains the same format but is more likely to produce successful or relevant results. As a non-limiting example, a machine learning model may be used to replace obscure words in a text file with more common words that have similar or identical meanings. In this example, this may be done by training a machine learning model on samples of text using unsupervised learning such that the machine learning model learns associations between words (such as based on how frequently they are used together). In this example, words may be represented as vectors with dimensions indicating their relationship to other words, and whether words are synonyms may be determined based on how similar their vectors are (as in, if vectors representing 2 words point in the same direction, those words may be synonyms). In this example, a first word determined to be similar to or a synonym of a second word, may be replaced by the second word. Such a machine learning model may include a neural network. Such a machine learning model may include a deep learning network, such as one with 2 or more internal layers. Such a machine learning model may be implemented as described in the context of language models.

Still referring to FIG. 1, in some embodiments, feature extraction process 144 may include a deep neural network (DNN). As used in this disclosure, a "deep neural network" is defined as a neural network with two or more hidden layers. Neural network is described in further detail below with reference to FIGS. 4-6. In a non-limiting example, feature extraction process 144 may include a convolutional neural network (CNN). Extracting input feature 132 from input data 116 may include training CNN using training data and extracting input feature 132 from input data 116 using trained CNN. The CNN is further described in detail below. In some cases, CNN may include, without limitation, a deep neural network (DNN) extension. Mathematical (or convolution) operations performed in the convolutional layer may include convolution of two or more functions, where the kernel may be applied to input data 116 through a sliding window approach. In some cases, convolution operations may enable processor 104 to detect local/global patterns, edges, textures, and any other features described herein within input data 116. Input data 116 may be passed through one or more activation functions, such as without limitation, Rectified Linear Unit (ReLU), to introduce non-linearities into the processing step of extraction. Additionally, or alternatively, CNN may also include one or more pooling layers, wherein each pooling layer is configured to reduce the dimensionality of input data while preserving essential features within the input data.

Still referring to FIG. 1, CNN may further include one or more fully connected layers configured to combine features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, input feature 132. Further, each fully connected layer may be followed by one or more dropout layers configured to prevent overfitting, and one or more normalization layers to stabilize the learning process described herein.

With continued reference to FIG. 1, in an embodiment, training the feature extraction process 144 (i.e., CNN or DNN) may include selecting a suitable loss function to guide the training process. In a non-limiting example, a loss function that measures the difference between the predicted input feature 132 and exemplary input features of training data e.g., exemplary input features may be used, such as, without limitation, mean squared error (MSE) or a custom loss function may be designed for one or more embodiments described herein. Additionally, or alternatively, optimization algorithms, such as stochastic gradient descent (SGD), may then be used to adjust the parameters of feature extraction process 144 to minimize such loss. In a further non-limiting embodiment, instead of directly predicting input feature 132, feature extraction process 144 may be trained as a regression model to predict numerical value, characteristic value, and the like. Additionally, CNN may be extended with additional deep learning techniques, such as recurrent neural networks (RNNs) or attention mechanism, to capture additional features and/or data relationships within input data. These extensions may further enhance the accuracy and robustness of the feature extraction.

Still referring to FIG. 1, in some embodiments, input data 116 may be processed using optical character recognition model. In some embodiments, optical character recognition model may convert image data to a different data form, such as a text document. In some embodiments, an image may be categorized as a document containing an image of text prior to such document being input into optical character recognition model. In some embodiments, such categorization may be done using a classifier. In some embodiments, such categorization may be done using a text recognition classifier. Text recognition classifier may be trained on a dataset including image data, associated with whether or not the image data includes text. Text recognition classifier may accept as an input image data and may output a determination as to whether the input image depicts text. In some embodiments, optical character recognition model may be applied to a file that includes an image element and may also include additional elements. For example, optical character recognition model may be applied to a PDF document.

Still referring to FIG. 1, in some embodiments, optical character recognition or optical character reader (OCR) includes automatic conversion of images of written (e.g., typed, handwritten or printed text) into machine-encoded text. In some cases, recognition of at least a keyword from input data 116 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to hand-writing recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of input data 116. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to input data 116 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of input data 116. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of input data 116.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of input data 116. Matrix matching may also rely on a stored glyph being in a similar font and at a same scale as input glyph. Matrix matching may work best with typewritten text.

Still referring to FIG. 1, in some embodiments, an OCR process may include a feature extraction process 144. In some cases, feature extraction may decompose a glyph into at least a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIGS. 4-6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. A first pass may try to recognize a character. Each character that is satisfactory is passed to an adaptive classifier as training data. The adaptive classifier then gets a chance to recognize characters more accurately as it further analyzes input data 116. Since the adaptive classifier may have learned something useful a little too late to recognize characters on the first pass, a second pass is run over the input data 116. Second pass may include adaptive recognition and use characters recognized with high confidence on the first pass to recognize better remaining characters on the second pass. In some cases, two-pass approach may be advantageous for unusual fonts or low-quality input data 116. Another exemplary OCR software tool may include OCRopus. OCRopus development is led by German Research Centre for Artificial Intelligence in Kaiserslautern, Germany. In some cases, OCR software may employ neural networks.

Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of input data 116. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, in some embodiments, input data 116 may be processed using automatic speech recognition model. In some embodiments, automatic speech recognition may require training (i.e., enrollment). In some cases, training an automatic speech recognition model may require an individual speaker to read text or isolated vocabulary. In some cases, speech training data may include an audio component having an audible verbal content, the contents of which are known a priori by a computing device. Computing device may then train an automatic speech recognition model according to training data which includes audible verbal content correlated to known content. In this way, computing device may analyze a person's specific voice and train an automatic speech recognition model to the person's speech, resulting in increased accuracy. Alternatively, or additionally, in some cases, computing device may include an automatic speech recognition model that is speaker independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, computing device may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within input data 116, but others may speak as well.

Still referring to FIG. 1, in some embodiments, an automatic speech recognition process may include one or all of acoustic modeling, language modeling, and statistically based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments, HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis, or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (e.g., meeting data). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (e.g., meeting data) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics, any data that can be turned into a linear representation can be analyzed with DTW. In some cases, DTW may be used by an automatic speech recognition process to cope with different speaking (i.e., audible verbal content) speeds. In some cases, DTW may allow computing device to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 5-6. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, in some embodiments, a language model may be used to process input data 116. As used herein, a "language model" is a program capable of interpreting natural language, generating natural language, or both. In some embodiments, a language model may be configured to interpret the output of an automatic speech recognition function and/or an OCR function. A language model may include a neural network. A language model may be trained using a dataset that includes natural language.

Still referring to FIG. 1, generating language model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, processor 108 may determine one or more language elements (e.g., input feature 132, and the like) in input data 116 by identifying and/or detecting associations between one or more language elements (including phonemes or phonological elements, morphemes or morphological elements, syntax or syntactic elements, semantics or semantic elements, and pragmatic elements) extracted from at least user data and/or response, including without limitation mathematical associations, between such words. Associations between language elements and relationships of such categories to other such term may include, without limitation, mathematical associations, including without limitation statistical correlations between any language element and any other language element and/or Language elements. Processor 108 may compare an input such as a sentence from input data 116 with a list of keywords or a dictionary to identify language elements. For example, processor 108 may identify whitespace and punctuation in a sentence and extract elements comprising a string of letters, numbers or characters occurring adjacent to the whitespace and punctuation. Processor 108 may then compare each of these with a list of keywords or a dictionary. Based on the determined keywords or meanings associated with each of the strings, processor 108 may determine an association between one or more of the extracted strings and a feature of a resource receiver or resource. Associations may take the form of statistical correlations and/or mathematical associations, which may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory.

Still referring to FIG. 1, processor 108 may be configured to determine one or more language elements in input data 116 using machine learning. For example, processor 108 may generate the language processing model by any suitable method, including without limitation a natural language processing classification algorithm; language processing model may include a natural language process classification model that enumerates and/or derives statistical relationships between input terms and output terms. An algorithm to generate language processing model may include a stochastic gradient descent algorithm, which may include a method that iteratively optimizes an objective function, such as an objective function representing a statistical estimation of relationships between terms, including relationships between input language elements and output patterns or conversational styles in the form of a sum of relationships to be estimated. In an alternative or additional approach, sequential tokens may be modeled as chains, serving as the observations in a Hidden Markov Model (HMM). HMMs, as used herein, are statistical models with inference algorithms that may be applied to the models. In such models, a hidden state to be estimated may include an association between an extracted word, phrase, and/or other semantic unit. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Still referring to FIG. 1, processor 108 may be configured to determine one or more language elements in input data 116 using machine learning by first creating or receiving language classification training data. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

Still referring to FIG. 1, language classification training data may be a training data set containing associations between language element inputs and associated language element outputs. Language element inputs and outputs may be categorized by communication form such as written language elements, spoken language elements, typed language elements, or language elements communicated in any suitable manner. Language elements may be categorized by component type, such as phonemes or phonological elements, morphemes or morphological elements, syntax or syntactic elements, semantics or semantic elements, and pragmatic elements. Associations may be made between similar communication types of language elements (e.g., associating one written language element with another written language element) or different language elements (e.g., associating a spoken language element with a written representation of the same language element). Associations may be identified between similar communication types of two different language elements, for example written input consisting of the syntactic element "that" may be associated with written phonemes /th/, /ă/, and /t/. Associations may be identified between different communication forms of different language elements. For example, the spoken form of the syntactic element "that" and the associated written phonemes above. Language classification training data may be created using a classifier such as a language classifier. An exemplary classifier may be created, instantiated, and or run using processor 108, or another computing device. Language classification training data may create associations between any type of language element in any format and other type of language element in any format. Additionally, or alternatively, language classification training data may associate language element input data to a feature related to an entity.

With continued reference to FIG. 1, memory 112 contains instructions configuring processor 108 to classify each data element of input data 116 into a plurality of interconnected modules 104 as a function of at least an input feature 132. For the purposes of this disclosure, "interconnected modules" are a plurality of functionally distinct but communicatively integrated software or system components configured to process input data. In some cases, each interconnected module 104 may be configured to handle a specific aspect of functionality (e.g., financial tracking, recipient engagement, inventory management, predictive analysis, and the like) while sharing data and interacting with other interconnected modules 104. As a non-limiting example, interconnected modules 104 may include a funding management module configured to manage financial transactions, generate invoices, manage payment, maintain complete financial record for each funding recipient (e.g., resource receiver), integrate with other business system, and reconcile disbursements. As another non-limiting example, interconnected modules 104 may include a recipient management module configured to store and update recipient profiles (e.g., input data profile 148), contact information, participation records, and eligibility data associated with resource receiver, track specific program requirements, and the like. This may enable long-term client management. As another non-limiting example, interconnected modules 104 may include an inventory management module configured to track status and allocation of physical resource, equipment, and other inventory items distributed to resource receiver. As another non-limiting example, interconnected modules 104 may include a user administration module configured to manage authentication, access control, and compliance roles for various system users, provide role-based access control for administrators, staff members, and recipients with appropriate permission levels. This may allow for tracking of facility compliance. As another non-limiting example, interconnected modules 104 may include a survey and form distribution module configured to issue surveys or forms (e.g., input collecting template 152) and collect structured responses (e.g., template input 120). As another non-limiting example, interconnected modules 104 may include a reporting and analytics module configured to analyze data and generate predictive or evaluative reports and data visualizations on funding distribution, recipient demographics, survey responses, and other key metrics. As another non-limiting example, interconnected modules 104 may include a recipient portal module configured to provide recipients with secure access to their personal funding and program data, provide funding recipients access to their own dedicated portal where they can view funding status, complete required forms, respond to surveys, and communicate with the funding organization. As another non-limiting example, interconnected modules 104 may include a predictive evaluation module configured to compute efficacy scores or generate forecasts using machine-learning models. In some cases, interconnected modules 104 may exchange data continuously or conditionally, such that changes in one module may influence the behavior or output of others. For example, and without limitation, interconnected modules 104 may exchange data such that when a survey and form distribution module receive a weekly update from a resource receiver indicating non-compliance (e.g., such as failure to engage in job search activities), a funding management module is automatically triggered to modify the recipient's scholarship disbursement schedule or suspend further payment and a recipient management module may update the recipient's status to "at risk," and a reporting and analytics module may log the event and adjust the recipient's compliance score (e.g., distribution efficacy score 156) or predictive efficacy output (e.g., output data 136). This architectural structure may allow apparatus 100 to operate as a cohesive, adaptive system rather than as a set of isolated processes, thereby improving operational efficiency, responsiveness, and technical robustness.

With continued reference to FIG. 1, in some embodiments, input features 132 may serve as classification or decision criteria for distributing input data 116 to a plurality of interconnected modules 104. Based on the presence, absence, or value of each input feature 132, processor 108 may determine which interconnected module or modules require access to the corresponding data element. For example, and without limitation, if an input feature 132 indicates that a resource receiver has submitted a weekly progress survey, processor 108 may route that data element to a survey and form distribution module for recordkeeping and to a predictive evaluation module to update the resource receiver's distribution efficacy score 156. The distribution efficacy score 156 described herein is further described in detail below. For example, and without limitation, if an input feature 132 reflects an inventory request or necessity for a physical resource, data element associated with the input feature 132 may be routed to an inventory management module and potentially to a funding management module if a monetary transaction is involved. This functionally segmented routing architecture can enable efficient use of computational resources, supports module-specific data processing, and may ensure that sensitive or domain-specific data is handled only by the appropriate modules. It can facilitate real-time or conditional inter-module synchronization, as downstream modules may rely on timely access to only the relevant subsets of input data 116 to maintain operational accuracy and system scalability.

With continued reference to FIG. 1, in some embodiments, processor 108 may distribute input data 116 to a plurality of interconnected modules 104 using an input data classifier. For the purposes of this disclosure, an "input data classifier" is a machine-learning model, such as a mathematical model, neural net, or program generated by a machine learning algorithm known as a "classification algorithm," that sorts input data related inputs into categories or bins of data. The input data classifier disclosed herein may be consistent with a classifier disclosed with respect to FIG. 4. In some embodiments, input data classifier may be trained with classification training data correlating input data 116 or data elements of input data 116 to one or more of interconnected modules 104 as a function of input feature 132. The training data disclosed herein is further disclosed with respect to FIG. 2. In some embodiments, classification training data may be stored in a distribution database 128. In some embodiments, classification training data may be received from one or more users, distribution database 128, external computing devices, and/or previous iterations of processing. As a non-limiting example, classification training data may include instructions from a user, who may be an expert user, a past user in embodiments disclosed herein, or the like, which may be stored in memory and/or stored in distribution database 128, where the instructions may include labeling of training examples.

With continued reference to FIG. 1, in some embodiment, input data classifier may be trained with classification training data correlating a plurality of data elements of input data 116 to one or more interconnected modules 104 using at least an input feature 132. In some embodiments, processor 108 may be configured to generate a classifier (such as but not limited to input data classifier) using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 108 may then calculate a likelihood table by calculating probabilities of different data entries and classification labels. Processor 108 may utilize a naïve Bayes equation to calculate a posterior probability for each class. A class containing the highest posterior probability is the outcome of prediction. Naïve Bayes classification algorithm may include a gaussian model that follows a normal distribution.

Naïve Bayes classification algorithm may include a multinomial model that is used for discrete counts. Naïve Bayes classification algorithm may include a Bernoulli model that may be utilized when vectors are binary.

With continued reference to FIG. 1, processor 108 may be configured to generate classifier (such as but not limited to input data classifier) using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in distribution database 128, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, in some embodiments, processor 108 may be configured to classify data elements of input data 116 into one or more interconnected modules 104 using a group lookup table. For the purposes of this disclosure, a "group lookup table" is a lookup table that relates data elements of input data to one or more interconnected modules using an input feature. A "lookup table," for the purposes of this disclosure, is an array of data that maps input values to output values. A lookup table may be used to replace a runtime computation with an array indexing operation. In an embodiment, the lookup table may include interpolation. For the purposes of this disclosure, an "interpolation" refers to a process for estimating values that lie between the range of known data. As a non-limiting example, the lookup table may include an output value for each of input values. When the lookup table does not define the input values, then the lookup table may estimate the output values based on the nearby table values. In another embodiment, the lookup table may include an extrapolation. For the purposes of this disclosure, an "extrapolation" refers to a process for estimating values that lie beyond the range of known data. As a non-limiting example, the lookup table may linearly extrapolate the nearest data to estimate an output value for an input beyond the data. In some embodiments, processor 108 may 'lookup' given input feature 132 to find corresponding interconnected modules 104 for data elements of input data 116 using a group lookup table.

With continued reference to FIG. 1, classifying each data element of input data 116 includes generating an input data profile 148, wherein the input data profile 148 includes a set of data elements of the input data 116 associated with a resource receiver. For the purposes of this disclosure, an "input data profile" is a structured data construct that aggregates, organizes, and stores relevant information. In some embodiments, input data profile 148 may be associated with a specific resource receiver and/or specific administering entity. In a non-limiting example, input data profile 148 may be a digital representation of a resource receiver's current and historical status with respect to resource eligibility, utilization, compliance, and participation. In another non-limiting example, input data profile 148 may be a digital representation of an inventory or organization of an administering entity. As a non-limiting example, input data profile 148 may include any data element of input data 116. In some embodiments, input data profile 148 may be stored in distribution database 128. In some cases, processor 108 may generate input data profile 148 by organizing data elements into a structured format. This may involve storing key-value pairs, time-stamped entries, status flags, or embedded objects that collectively represent the recipient's real-time engagement with the system. The input data profile 148 may be then stored in memory 112 or a persistent data store (e.g., distribution database 128) accessible to a plurality of interconnected modules 104. Interconnected modules 104 may reference, update, or conditionally trigger actions based on the contents of input data profile 148.

With continued reference to FIG. 1, in some embodiments, generating the input data profile 148 may include receiving application data of at least a first portion of input data 116 continuously (first interval), receiving template data of at least a second portion of the input data 116 periodically (second interval) and classifying each of the portions of the input data 116 to the input data profile 148, wherein classifying may include analyzing textual data in the application data and the template data using a natural language processing and optical character recognition. The natural language processing and the OCR disclosed herein are further described in detail above. For example, textual data indicating a resource receiver's housing status may be classified under a "housing" section of input data profile 148, while numerical data related to weekly expenditures may be categorized under a "financial activity" segment of input data profile 148. As a non-limiting example, template data such as binary indicators of compliance (e.g., "yes" to attending counseling) may be stored within a "program adherence" component of input data profile 148. Each interval may influence how data is validated, classified, or prioritized within the system. For example, and without limitation, data received at shorter intervals (e.g., data received periodically) may be used to update the input data profile 148 more frequently, while data received at longer intervals (e.g., data received continuously) may provide broader historical or aggregate context. For the purposes of this disclosure, "textual data" is data represented in natural language or character-based formats. As a non-limiting example, textual data may include free-text descriptions, categorical labels, written narratives, answers to open-ended questions, or standardized form entries expressed in alphanumeric characters. In some embodiments, textual data may be analyzed using natural language processing (NLP) techniques to extract input features, generate embeddings, detect sentiment, classify thematic content, or determine eligibility criteria. In some cases, processor 108 may apply tokenization, part-of-speech tagging, named entity recognition, or language model-based embeddings to convert textual data into machine-readable representations suitable for classification into interconnected modules 104, detection of data conflict or duplication, or incorporation into input data profile 148.

With continued reference to FIG. 1, managing and interpreting such multisource data poses technical challenges, particularly where overlapping or conflicting entries arise, or where temporal gaps must be resolved to maintain a coherent system state. In some cases, apparatus 100 can address these challenges by programmatically classifying each data element based on extracted input features and associating the classified data with an input data profile 148 tied to a specific resource receiver. This modular classification may allow processor 108 to resolve ambiguity by associating each data input with a contextually appropriate module, such as financial records, survey responses, or inventory data. The classification process may support prioritization of higher-fidelity sources, detection of inconsistencies, and aggregation of partial updates into a unified representation. By structuring the system around a plurality of interconnected modules 104, apparatus 100 can ensure that each incoming data element is processed according to its content type and relevance, enabling continuous integration of multisource input into real-time operational workflows. As a result, apparatus 100 can provide a technically robust framework for organizing, synchronizing, and responding to complex, variably timed data streams without manual intervention.

With continued reference to FIG. 1, memory 112 contains instructions configuring processor 108 to generate, using a plurality of interconnected modules 104, output data 136 as a function of classified data element of input data 116. For the purposes of this disclosure, "output data" is information generated as a result of processing input data through one or more of a plurality of interconnected modules. In some cases, output data 136 may be configured to inform or direct one or more aspects of resource distribution. As a non-limiting example, output data 136 may include a distribution decision identifying which resource is to be allocated to which resource receiver, quantity or schedule of that allocation, and associated conditions or constraints. As another non-limiting example, output data 136 may include analytical results such as risk classifications, efficacy scores, statistical distributions of expected outcomes, or performance rankings of facilities or recipients. In some embodiments, output data 136 may include instructions or status updates to be rendered within a user interface 160, such as alerts, funding summaries, resource confirmations, or messages to resource receivers or administering entities. For example, and without limitation, output data 136 may include a decision to allocate $500 of remaining scholarship funds to a recipient identified by their unique ID, along with a schedule specifying that the funds are to be disbursed over the next two weeks. For example, and without limitation, output data 136 may include a distribution efficacy score 156 of 0.81, indicating a high likelihood that the allocated resource will result in successful program completion based on historical patterns. For example, and without limitation, output data 136 may include a compliance status labeled "non-compliant" due to a missed weekly form submission, triggering a conditional suspension of further disbursements. For example, and without limitation, output data 136 may include a graphical indicator (e.g., graphical interface element) for display in user interface 160, such as a red alert icon paired with the message "Recipient at Risk: Action Required." For example, and without limitation, output data 136 may include a facility performance rank. For example, and without limitation, output data 136 may include a reallocation directive indicating that unused funds from a completed recipient program are to be transferred to another eligible recipient. In some embodiments, output data 136 may be stored in distribution database 128 and processor 108 may retrieve output data 136 from distribution database 128. In some embodiments, user may manually determine output data 136.

With continued reference to FIG. 1, in a non-limiting example, if input data profile 148 for a recourse receiver includes a plurality of input features 132 including the recourse receiver has completed four of six required weekly updates, is currently residing in a MASH-certified silver home, has a relapse risk score of 0.15, and has utilized 70% of their allocated scholarship funds. This data may be processed by a recipient management module, which confirms participation and housing status, a survey/form distribution module, which verifies missed or submitted updates, and a predictive evaluation module, which uses a score machine-learning model to generate a distribution efficacy score 156 of 0.84, based on historical correlations between similar profiles and successful program outcomes. Additionally, a funding management module may detect an unused balance of $150, while a compliance monitoring module notes that the resource receiver's weekly compliance threshold remains above the required minimum. Based on this aggregation of real-time conditions and predictive evaluation, processor 108 may generate output data 136 including a continuation decision for the remaining scholarship funds, a predicted outcome classification of "high likelihood of completion," and a user interface alert stating, "final disbursement scheduled—week 5 of 6."

With continued reference to FIG. 1, in some embodiments, a plurality of interconnected modules 104 may include a plurality of interconnected machine-learning models 164. For the purposes of this disclosure, "interconnected machine-learning models" are a plurality of distinct but communicatively linked machine-learning models that are each associated with one or more of a plurality of interconnected modules. Each interconnected machine-learning model 164 may be configured to perform a specialized predictive, classificatory, or evaluative function based on input data 116, input features 132 or input data profile 148. In some cases, while each interconnected machine-learning model 164 operates within its respective functional domain, the interconnected machine-learning models 164 may exchange data outputs or intermediate inferences with one another to support cross-module learning and coordinated output generation. For example, and without limitation, a predictive evaluation module may include a score machine-learning model trained to generate distribution efficacy scores 156, while a funding management module may include a model trained to forecast optimal disbursement amounts based on resource receiver behavior patterns. For example, and without limitation, a compliance monitoring module may incorporate a model trained to classify risk levels based on weekly updates and relapse indicators. In some cases, interconnected machine-learning models 164 may be considered "interconnected" in that the output of one model may serve as an input feature for another model.

With continued reference to FIG. 1, in some embodiments, processor 108 may be configured to generate a plurality of sets of model training data 168, wherein each set corresponds to historical output generation data relevant to a particular module or resource type. Each interconnected machine-learning model 164 may be then trained using its respective data set to perform module-specific predictions or evaluations. After training, the interconnected machine-learning models 164 may operate either concurrently or in sequence to generate output data 136 with each model's inference contributing to a shared, modular decision-making process. The use of interconnected machine-learning models can allow an apparatus 100 to leverage specialized learning architectures while maintaining system-wide cohesion in resource distribution logic.

With continued reference to FIG. 1, in some embodiments, processor 108 may be configured to generate model training data 168. In a non-limiting example, model training data 168 may include exemplary input data correlated to exemplary output data. In some embodiments, model training data 168 may be stored in distribution database 128. In some embodiments, model training data 168 may be received from one or more users, distribution database 128, external computing devices, and/or previous iterations of processing. As a non-limiting example, model training data 168 may include instructions from a user, who may be an expert user, a past user in embodiments disclosed herein, or the like, which may be stored in memory and/or stored in distribution database 128, where the instructions may include labeling of training examples. In some embodiments, model training data 168 may be updated iteratively on a feedback loop. As a non-limiting example, processor 108 may update model training data 168 iteratively through a feedback loop as a function of input data 116, input feature 132, or the like. In some embodiments, processor 108 may be configured to generate an interconnected machine-learning model 164. In a non-limiting example, generating interconnected machine-learning model 164 may include training, retraining, or fine-tuning interconnected machine-learning model 164 using model training data 168 or updated model training data 168. In some embodiments, interconnected machine-learning model 164 may have been trained with model training data 168. In some embodiments, processor 108 may be configured to determine output data 136 using interconnected machine-learning model 164 (i.e., trained or updated interconnected machine-learning model 164). In some embodiments, interconnected machine-learning model 164 may receive input data 116 or input data profile 148 as inputs and may generate output data 136 in response to the inputs. In some embodiments, generating training data and training machine-learning models may be simultaneous. In some embodiments, processor 108 may generate output data 136 without the use of interconnected machine-learning model 164.

With continued reference to FIG. 1, in some embodiments, generating output data 136 may include generating a distribution efficacy score 156 as a function of historical resource distribution data of the input data 116 using a score machine-learning model of a plurality of interconnected modules 104 and generating the output data 136 as a function of the distribution efficacy score 156. For the purposes of this disclosure, a "distribution efficacy score" is a value that estimates predicted effectiveness, suitability, or expected success of a proposed or executed resource distribution with respect to a specific resource receiver. In some cases, distribution efficacy score 156 may serve as an evaluative metric indicating how likely a particular resource distribution is to result in a favorable outcome, such as program adherence, successful recovery, reduction in relapse events, or efficient use of allocated resources. In some embodiments, distribution efficacy score 156 may serve to evaluate parameters including fund utilization efficiency, recipient compliance rates, and logistical distribution timelines. In some embodiments, distribution efficacy score 156 may be expressed as a probability value (e.g., 0.87), a categorical label (e.g., "high efficacy"), or a normalized ranking within a defined scale. In some embodiments, distribution efficacy score 156 may reflect confidence intervals or predictive variance derived from a statistical distribution model associated with the underlying machine-learning inference. In some embodiments, distribution efficacy score 156 may be stored in distribution database 128 and processor 108 may retrieve distribution efficacy score 156 from distribution database 128. In some embodiments, user may manually input distribution efficacy score 156.

With continued reference to FIG. 1, in some embodiments, processor 108 may be configured to generate score training data. In a non-limiting example, score training data may include exemplary input data correlated to exemplary distribution efficacy scores. In some embodiments, score training data may be stored in distribution database 128. In some embodiments, score training data may be received from one or more users, distribution database 128, external computing devices, and/or previous iterations of processing. As a non-limiting example, score training data may include instructions from a user, who may be an expert user, a past user in embodiments disclosed herein, or the like, which may be stored in memory and/or stored in distribution database 128, where the instructions may include labeling of training examples. In some embodiments, score training data may be updated iteratively on a feedback loop. As a non-limiting example, processor 108 may update score training data iteratively through a feedback loop as a function of input data 116, input feature 132, input data profile 148, output of models in this disclosure, or the like. In some embodiments, processor 108 may be configured to generate a score machine-learning model. In a non-limiting example, generating score machine-learning model may include training, retraining, or fine-tuning score machine-learning model using score training data or updated score training data. In some embodiments, score machine-learning model may have been trained with score training data. In some embodiments, processor 108 may be configured to determine distribution efficacy score 156 using score machine-learning model (i.e., trained or updated score machine-learning model). In some embodiments, score machine-learning model may receive input data 116 as inputs and may output distribution efficacy score 156 in response to the inputs. In some embodiments, generating training data and training machine-learning models may be simultaneous. In some embodiments, processor 108 may generate distribution efficacy score 156 without the use of score machine-learning model.

With continued reference to FIG. 1, in some embodiments, generating distribution efficacy score 156 may include generating distribution efficacy score 156 using a structured statistical distribution, wherein the structured statistical distribution may represent at least one confidence interval and a plurality of distribution probabilities associated with potential resource distributions. For the purposes of this disclosure, a "structured statistical distribution" refers to a mathematical representation of the range and likelihood of possible outcomes associated with a distribution efficacy score. In some cases, structured statistical distribution may be derived from outputs of one or more interconnected machine-learning models 164 or from historical distribution data 172 processed by statistical inference algorithms. In some cases, structured statistical distribution may follow a defined probabilistic form, such as a Gaussian distribution, binomial distribution, or a learned empirical distribution. For the purposes of this disclosure, a "confidence interval" is a bounded numerical range within structured statistical distribution that represents the estimated certainty with which the true outcome of a resource distribution is expected to fall within that range. For example, and without limitation, a 95% confidence interval around a predicted distribution efficacy score of 0.81 might span from 0.75 to 0.87, indicating that, based on the model and data, there is a 95% probability that the actual effectiveness of the distribution lies within that interval. For the purposes of this disclosure, "distribution probabilities" refer to probabilities assigned to various outcome scenarios within the structured statistical distribution probabilities distribution. In a non-limiting example, distribution probabilities may indicate the likelihood of specific results occurring, such as successful program completion, partial compliance, or relapse, given current input data profile 148 and modeled historical trends. For instance, and without limitation, processor 108 may determine that there is a 70% probability that a resource receiver will complete a program if a resource is distributed as proposed, a 20% probability of only partial engagement, and a 10% probability of early withdrawal. These distribution probabilities can allow apparatus 100 to incorporate risk assessment, outcome forecasting, and prioritization of recipients based on predicted impact.

With continued reference to FIG. 1, in some embodiments, generating output data 136 may include determining a resource status 176 as a function of historical resource distribution data of input data 116 and generating the output data 136 as a function of the resource status 176. For the purposes of this disclosure, "resource status" is a condition indicator associated with a specific resource. In some cases, resource status 176 may reflect current availability, assignment state, utilization history, or the like of resources (e.g., resource inventory). In some embodiments, resource status 176 may be determined by processor 108 based on resource data. As a non-limiting example, resource status 176 may include indicators such as "available," "allocated," "reserved," "in use," "depleted," "expired," "returned," or "unverified." As another non-limiting example, for financial resources, resource status 176 may represent the percentage of funds disbursed or remaining, whether funds are on hold, or whether a funding period has lapsed. As another non-limiting example, for physical resources, such as housing units or therapeutic animals, resource status 176 may include assignment timestamps, delivery confirmations, or maintenance-related unavailability. In some embodiments, resource status 176 may be stored in distribution database 128 and processor 108 may retrieve resource status 176 from distribution database 128. In some embodiments, user may manually input resource status 176.

With continued reference to FIG. 1, in some embodiments, processor 108 may determine resource status 176 using one or more of interconnected modules. For example, and without limitation, inventory management module may monitor the logistical availability of physical resources, such as housing units, comfort animals, or distributed equipment. When a recipient is assigned a resource, the inventory management module may update its internal status from "available" to "allocated" and may initiate a timestamped transaction record. If the resource is subsequently confirmed as delivered or activated, the resource status 176 may transition to "in use." If the resource is returned, reported as damaged, or expired based on policy timelines, the resource status 176 may change to "returned", "unavailable", or "depleted." In some cases, a funding management module may track financial resource status 176 by monitoring scheduled disbursements, recipient usage, and remaining balances. For example, and without limitation, after processing a weekly fund transfer, this module may change the financial resource status 176 from "scheduled" to "disbursed," and upon completion of the funding period, to "expired."

With continued reference to FIG. 1, memory 112 contains instructions configuring processor 108 to generate a user interface 160 including a digital representation of output data 136. In some embodiments, user interface 160 may include input data profile 148 and input data 116. For the purposes of this disclosure, a "digital representation" refers to a machine-readable and visually or programmatically accessible encoding of data. A digital representation may take the form of text, symbols, numerical values, graphics, charts, or interactive interface elements. For the purposes of this disclosure, a "user interface" is a means by which a user and a computer system interact. A user interface 160 may include a graphical user interface (GUI), command line interface (CLI), menu-driven user interface, touch user interface, voice user interface (VUI), form-based user interface, any combination thereof and the like. In some embodiments, user interface 160 may operate on and/or be communicatively connected to a decentralized platform, metaverse, and/or a decentralized exchange platform associated with the user. In some embodiments, a user may interact with the user interface 160 using a computing device distinct from and communicatively connected to at least a processor 108. For example, a smart phone, smart, tablet, or laptop operated by a user, administering entity and/or resource receiver. In an embodiment, user interface 160 may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs, and the like because clicking on them yields instant access.

With continued reference to FIG. 1, in some embodiments, generating user interface 160 may include generating a graphical interface element, wherein the graphical interface element indicates an update of input data profile 148. For the purposes of this disclosure, a "graphical interface element" is a visual component displayed within a user interface, configured to convey information. As a non-limiting example, graphical interface elements may include visual indicators such as icons, badges, status bars, interactive buttons, dropdown menus, charts, tables, progress trackers, alert boxes, or message prompts. For example, and without limitation, a graphical interface element may be configured to depict a real-time representation of a distribution decision, such as a disbursement confirmation, a funding progress bar, or a recipient-specific compliance status flag. In other embodiments, graphical interface elements may be dynamically updated in response to the execution of a distribution datum 140, enabling user interface 160 to reflect the most current state of resource distribution, user compliance, or resource receiver engagement. In some cases, graphical interface elements may be interactive or static. In some cases, graphical interface elements may enable users of apparatus 100 to visualize, interpret, and interact with complex data and actions in a coherent and accessible format, thereby facilitating real-time monitoring, verification, and decision-making across the resource distribution system.

With continued reference to FIG. 1, generating user interface 160 includes executing a distribution datum 140 as a function of output data 136. For the purposes of this disclosure, a "distribution datum" is a data element that indicates an executable instruction or machine-readable directive to initiate, trigger, or perform the distribution of a resource to a designated recipient. In some cases, distribution datum 140 may encapsulate operational parameters necessary to execute a resource allocation. As a non-limiting example, distribution datum 140 may encapsulate recipient identifiers, resource specifications, timing constraints, delivery methods, and procedural conditions. For example and without limitation, distribution datum 140 may include structured parameters such as disbursement amounts for financial resources, identifiers for physical inventory items, housing unit assignments, or access credentials for digital services. For example and without limitation, distribution datum 140 may include temporal information specifying when a distribution is to occur, along with conditions that must be satisfied before execution, such as compliance status, confirmation receipt, or eligibility verification. Once generated, the distribution datum 140 may be transmitted to an execution layer to complete the distribution task as prescribed. As a non-limiting example, the execution layer may be internal to apparatus 100 or external to a coordinating system.

Still referring to FIG. 1, in some embodiments, processor 108 may execute a distribution datum 140 by communicating a distribution datum 140 to an external device 124. In some embodiments, external device 124 may include a computing device associated with a financial transaction system, an inventory dispatch system, a facility management platform, or another resource execution system. In some embodiments, such a computing device may be configured to carry out resource distribution operations such as disbursing funds, assigning physical assets, or allocating housing units. In some embodiments, transmitting distribution datum 140 to a computing device associated with a financial transaction system may configure the computing device to initiate a resource transfer in accordance with the parameters contained in distribution datum 140. For example, and without limitation, processor 108 may transmit distribution datum 140 including a recipient identifier, a disbursement amount, and a scheduled execution time, such that the computing device is configured to execute a funds transfer to the recipient's designated account at the specified time. In some embodiments, transmitting distribution datum 140 to a computing device associated with an inventory dispatch system may configure the computing device to assign or release a physical resource to a designated recipient. In some embodiments, transmitting distribution datum 140 to a computing device associated with a facility management platform may configure the computing device to assign a housing unit or service slot to the resource receiver identified in an input data profile 148. In some embodiments, processor 108 may transmit distribution datum 140 to a user device associated with an administrator or recipient. In such embodiments, transmitting distribution datum 140 to the user device may include configuring the device to display a graphical interface element representing the executed distribution, such as a confirmation of resource allocation, a receipt of disbursement, or a notification of upcoming delivery. Such a communication may include a visual element and/or a visual element data structure, which may contain metadata identifying the resource, timing details, and completion status.

With continued reference to FIG. 1, in some embodiments, generating user interface 160 may include receiving a receiver credential 180 from an external device associated with the resource receiver, assigning an interface access level 184 as a function of the receiver credential 180 and presenting at least a portion of the output data as a function of the interface access level 184.

With continued reference to FIG. 1, in some embodiments, generating user interface 160 and/or updating input data profile 148 may include authenticating receiver credential 180 of a resource receiver and generating the user interface 160 and/or updating the input data profile 148 as a function of the receiver credential 180 by prioritizing at least a portion of input data 116 in the input data profile 148 or user interface 160. In some embodiments, processor 108 may be configured to receive the receiver credential 180 associated with users (e.g., administering entity and/or resource receivers) from an external device 124, compare the receiver credential 180 to an authorized receiver credential 180 stored within an authentication database, and bypass authentication for external device 124 based on the comparison of the receiver credential 180 from external device 124 to the authorized receiver credential 180 stored within authentication database. For the purposes of this disclosure, a "receiver credential" is a datum representing an identity, attribute, code, and/or characteristic specific to a resource receiver and/or user device. In some embodiments, processor 108 may user credential, which may include receiver credential. As a non-limiting example, user credential may include credentials received from an administering entity and/or resource receiver. For example, and without limitation, receiver credential 180 may include a username and password unique to user and/or external device 124. The username and password may include any alpha-numeric character, letter case, and/or special character.

With continued reference to FIG. 1, for the purposes of this disclosure, an "interface access level" is a classification that governs the scope, type, and degree of interaction a user is permitted to have with information within a user interface. In a non-limiting embodiment, processor 108 may manipulate any information of the entirety of this disclosure to be displayed to a user with varying authority or accessibility. Processor 108 may incorporate priority classifiers used to classify low, average, and high classification of authorized users (administering entity and/or resource receiver). Users with lower priority classifications detected by processor 108 may allow a limited amount of information (limited accessibility) to be displayed to an external device 124 for viewing by the users with lower priority classification. In a non-limiting embodiment, processor 108 may detect users with high priority classifications and transmit a robust information with full accessibility. Persons of ordinary skill in the art, after viewing the entirety of this disclosure, would appreciate the various amounts of information allowed to be viewed for different levels of authority. In a non-limiting embodiment, processor 108 may be used as a security measure for information. For instance, and without limitation, if an authenticated user is an administering entity, input data profile 148 may prioritize displaying resource status 176. For instance, and without limitation, if a user is a resource receiver, processor 108 may generate input data profile 148 to emphasize output data 136. In some embodiments, the prioritization of input data 116 may include rearranging their display order, highlighting certain input data 116, or applying filters to present information relevant to the user's context. For example, and without limitation, when accessed by a user with "administrator" credentials, input data profile 148 may display a broader range of input data 116, including sensitive or restricted information.

With continued reference to FIG. 1, in some embodiments, generating user interface 160 may include generating a distribution report 188 as a function of input data 116 and output data 136 using a language model. The language model described herein is further described above. For the purposes of this disclosure, a "distribution report" is a compilation of data that summarizes, explains, or evaluates one or more aspects of a resource distribution. As a non-limiting example, distribution report 188 may include information such as the identity of the resource receiver, the type and quantity of the resource distributed, the timing of the distribution, the conditions under which the distribution occurred, the current resource status 176, and any outcomes associated with the distribution, such as recipient engagement, compliance behavior, or follow-up results. In some embodiments, distribution report 188 may include predictive or analytical metrics, such as a distribution efficacy score 156, performance comparisons across recipients or facilities, or statistical summaries of resource usage patterns. In some embodiments, distribution report 188 may include visual components, such as tables, charts, color-coded indicators, or annotated narratives, that represent key data elements in a human-interpretable format. In some embodiments, a distribution report 188 may be generated using a natural language model or reporting engine (e.g., report and analysis module of interconnected module 104) that converts structured data into a textual summary. In some cases, distribution report 188 may be dynamically updated, versioned over time, or generated on demand in response to specific queries or triggers within the apparatus.

With continued reference to FIG. 1, in an embodiment, distribution report 188 or digital representation of output data 136 may be read-only. In another embodiment, distribution report 188 or digital representation of output data 136 may be writable. In some embodiments, the writable distribution report 188 or digital representation of output data may require authentication; for instance without limitation, the writable distribution report 188 or digital representation of output data may be writable only given receiver credential 180 indicating that an external device 124 that will be modifying distribution report 188 or digital representation of output data 136 is authorized. In some embodiments, distribution report 188 or digital representation of output data 136 may include any combination of the above; for instance without limitation, distribution report 188 or digital representation of output data 136 may include a read-only section. For the purposes of this disclosure, a "read-only section" is a portion of a distribution report 188 or digital representation of output data that is accessible for viewing but cannot be modified or altered by users. For example without limitation, distribution report 188 or digital representation of output data 136 may include a writable section with limited access. For the purposes of this disclosure, a "writable section" is a portion of a distribution report 188 or digital representation of output data that allows users to input, edit, or update information. In some embodiments, distribution report 188 or digital representation of output data 136 may include a writable section with general access, to which any user may be able to input data. Distribution report 188 or digital representation of output data 136 may include read-only section and generally writable section, or the limited access writable section and generally writable section, or read-only section and limited access section. The limited access section may be limited to certain users of apparatus 100, or in other words may be generally writable, but only to users of apparatus 100, who may have receiver credential 180; the users may alternatively be granted receiver credential 180 by apparatus 100 to update data only when authorized by the system, and otherwise be unable to update distribution report 188 or digital representation of output data 136. In some embodiments, preventing users from being able to write over a distribution report 188 or digital representation of output data 136 enables the distribution report 188 or digital representation of output data 136 to be free from intentional or unintentional corruption or inaccuracy, and enables apparatus 100 to ensure that certain information is always available to users. In some embodiments, writable sections enable apparatus 100 itself or users of apparatus 100 to correct, augment, or update information. For example, and without limitation, an authenticated user with "editor" privileges may gain access to writable sections of distribution report 188 or digital representation of output data 136 to input or modify information, while a "viewer" role may be restricted to interacting with read-only sections.

With continued reference to FIG. 1, in some embodiments, processor 108 may generate distribution report 188 or digital representation of output data 136 to include read-only sections and/or writable sections as a function of receiver credential 180, input feature 132, input data profile 148, input data 116, and the like. In a non-limiting example, processor 108 may analyze metadata (e.g., input feature 132, input data profile 148, input data 116, and the like) associated with each data field of distribution report 188 or digital representation of output data 136 and may include read-only sections and/or writable sections to distribution report 188 or digital representation of output data 136 as a function of the analysis and receiver credentials 180. For example, and without limitation, each data field within distribution report 188 or digital representation of output data 136 may be tagged with attributes defining its access level (e.g., "read-only" or "writable") and any conditions under which its access level may change. In some embodiments, for data fields designated as permanently read-only, processor 108 may lock these data fields, preventing any modifications regardless of receiver credentials 180. In some embodiments, for data fields where access depends on receiver credentials 180, processor 108 may authenticate a user and retrieve an access profile of the user. For the purposes of this disclosure, an "access profile" is a set of predefined rules and attributes associated with accessibility to a data structure that is assigned to a user. As a non-limiting example, access profile may include roles, permissions, contextual attributes (e.g., item or data-specific access), scope of user's access to data structure, and the like. In some embodiments, access profile may be retrieved from distribution database 128 or a user may manually input access profile. In some embodiments, processor 108 may compare access profile against metadata (e.g., input feature 132, input data profile 148, input data 116, and the like) of each data field of distribution report 188 or digital representation of output data 136 to determine which sections are writable for an authenticated user.

With continued reference to FIG. 1, user interface 160 or GUI may be configured to visually distinguish between read-only section and writable sections of distribution report 188 or digital representation of output data 136. In some embodiments, read-only sections may be displayed in a static format with visual cues. As a non-limiting example, read-only sections may be displayed in grayed-out text, locked icons, or the absence of interactive elements (e.g., text boxes or dropdown menus), and the like. In some embodiments, writable sections may be visually highlighted using editable fields, active buttons, or color coding to indicate that data in writable sections can be updated or modified. As a non-limiting example, writable sections may include editable elements; for instance, text boxes, drop-down menus, file upload buttons, different color coding, borders, or hover effects.

With continued reference to FIG. 1, in some embodiments, processor 108 or GUI may adjust display of read-only sections and/or writable sections within distribution report 188 or digital representation of output data 136. For example, and without limitation, if a user with "viewer" credentials logs in, processor 108 may generate distribution report 188 or digital representation of output data 136 to only display read-only sections, suppressing or disabling writable sections entirely. For example, and without limitation, for a user with "editor" credentials, processor 108 may generate distribution report 188 or digital representation of output data 136 to only display writable sections, allowing interaction while maintaining visual and functional separation from the read-only sections.

With continued reference to FIG. 1, memory 112 contains instructions configuring processor 108 to update an input data profile 148 as a function of execution of distribution datum 140. In some cases, updating an input data profile 148 may include modifying, augmenting, or annotating the input data profile 148 based on the outcome or implementation of output data 136 or executing distribution datum 140. For example, and without limitation, if output data 136 includes a resource allocation decision and the associated distribution datum 140 is executed to disburse funds or assign a physical item, processor 108 may update corresponding input data profile 148 to reflect the resource distribution. Continuing the non-limiting example, such an update may include recording a timestamp of execution, changing a resource status 176 field from "pending" to "disbursed," incrementing a usage counter, or storing a confirmation identifier received from an external system. In some embodiments, the update to an input data profile 148 may include adjusting predictive variables or compliance indicators. As a non-limiting example, updating input data profile 148 may include updating a program engagement score, distribution efficacy score 156, decrementing resource status 176, or appending execution metadata used in future evaluations. This dynamic update can ensure that the input data profile 148 remains a current and accurate reflection of the resource receiver's interaction with the system and can provide the basis for continuous recalibration of future distribution decisions by interconnected modules 104.

With continued reference to FIG. 1, in some embodiments, updating input data profile 148 may include generating an input collecting template 152 as a function of at least an input feature, executing the input collecting template 152 at an external device 124 associated with a resource receiver as a function of input data profile 148, receiving a template input 120 for the executed input collecting template 152 from the external device 124 and updating the input data profile 148 as a function of the template input 120. In some embodiments, updating input data profile 148 may include modifying output data 136 as a function of the template input 120 by changing a designated resource receiver of the output data 136. For the purposes of this disclosure, an "input collecting template" is a structure that collects information from a resource receiver or other user. In some embodiments, input collecting template 152 may be rendered using a user interface 160 and may be presented on a user device or external device 124. In some embodiments, input collecting template 152 may include a series of text fields, selection menus, checkboxes, rating scales, or open-ended response areas that prompt a resource receiver to report information such as program engagement activities, job search status, wellness indicators, housing conditions, or use of assigned resources. In some cases, structure and content of input collecting template 152 may be determined based on a current state of resource receiver's input data profile 148, conditions of a resource program, or timing of a reporting requirement. For example, and without limitation, an input collecting template 152 may include a weekly progress survey presented to a scholarship recipient participating in a six-week recovery program. This input collecting template 152 may contain structured fields such as "Have you actively searched for employment this week?" (Yes/No) "List any job applications submitted or interviews attended." (Open text field), and the like. In another example, an input collecting template 152 may be used to verify facility conditions for a silver home administrator. That template may include fields such as "Current number of residents in the facility." (Numerical input), "Are all occupants in compliance with program guidelines?" (Yes/No), and the like. In some cases, input collecting template 152 may be static or dynamic. As a non-limiting example, processor 108 may generate an input collecting template 152 adaptively, generating question sets based on recipient-specific variables, prior responses, or compliance history.

With continued reference to FIG. 1, for the purposes of this disclosure, a "template input" is data received in response to an input collecting template 152. In some cases, template input 120 may include binary responses (e.g., yes/no), scaled evaluations (e.g., 1-5), open-ended textual responses, dropdown selections, numerical entries, timestamps, geolocation data, or uploaded files such as images or documents. For example and without limitation, a template input 120 may include a resource receiver's self-reported weekly job search activities, verification of housing stability, updated health status, or compliance with program requirements.

With continued reference to FIG. 1, in a non-limiting example, generating an input collecting template 152 as a function of at least an input feature 132 may include creating a customized digital form or survey, where the structure and content of the form are determined by input feature 132. The input feature may include, for example, recipient program status, prior compliance indicators, risk level, or stage of resource utilization. Based on this input feature 132, processor 108 may select or compose specific questions, prompts, or data fields relevant to the current state or needs of resource receiver. Continuing the non-limiting example, executing input collecting template 152 at an external device 124 associated with a resource receiver as a function of input data profile 148 may include transmitting the input collecting template 152 to a user device, such as a smartphone or terminal used by the resource receiver. The decision to deliver the input collecting template 152, and its format or timing, may be guided by data stored in the resource receiver's input data profile 148. For example, and without limitation, if the input data profile 148 indicates that the resource receiver is in week four of a six-week program, processor 108 may execute a mid-program progress survey. Continuing the non-limiting example, once the resource receiver completes the input collecting template 152 on their device by answering questions, uploading required files, or submitting verification data, the template input 120 may be transmitted back to the processor 108. This input may be validated, parsed, and processed by the processor 108. Continuing the non-limiting example, updating input data profile 148 as a function of the template input 120 may include the integration of the newly received information (the template input 120) into the input data profile 148 representing the resource receiver. This may include overwriting outdated values, appending new records, recalculating derived metrics, or triggering internal flags. For instance, and without limitation, updating input data profile 148 may include modifying output data 136 as a function of template input 120 by changing a designated resource receiver of output data 136. In a non-limiting example, if a recipient indicates in the template input 120 that they have exited a program early, become ineligible, or no longer require a resource, processor 108 may reallocate resource to another qualified resource receiver with greater current need or a higher distribution efficacy score. For instance, and without limitation, if the template input 120 indicates that the resource receiver missed a required appointment, the compliance status in the input data profile 148 may be changed to "non-compliant," which can affect future output data 136 or distribution decisions. This workflow may enable apparatus 100 to operate in a closed-loop, data-informed manner by soliciting targeted information, interpreting responses in context, and continuously updating its internal state to support adaptive, individualized resource distribution.

With continued reference to FIG. 1, in some embodiments, generating user interface 160 may include generating and transmitting a notification to at least one user (e.g., resource receiver and/or administering entity). For the purposes of this disclosure, a "notification" is an indication to inform a user. In some embodiments, processor 108 may transmit notification to external device 124. In some embodiments, notification may include audio, text, image, vibration, and the like. In some embodiments, notification may include a text message, notification sound, phone call, notification banner, or the like. In some cases, notification may be generated to inform any user related to output data 136, input data profile 148, and the like. In a non-limiting example, processor 108 may generate and transmit notification to external device 124 to inform that user is determined for resource distribution, inventory needs to be filled, a certain resource receiver's eligibility has been changed, or the like. In some embodiments, notification may be stored in distribution database 128. In some embodiments, notification may be retrieved from distribution database 128.

Figure 2:
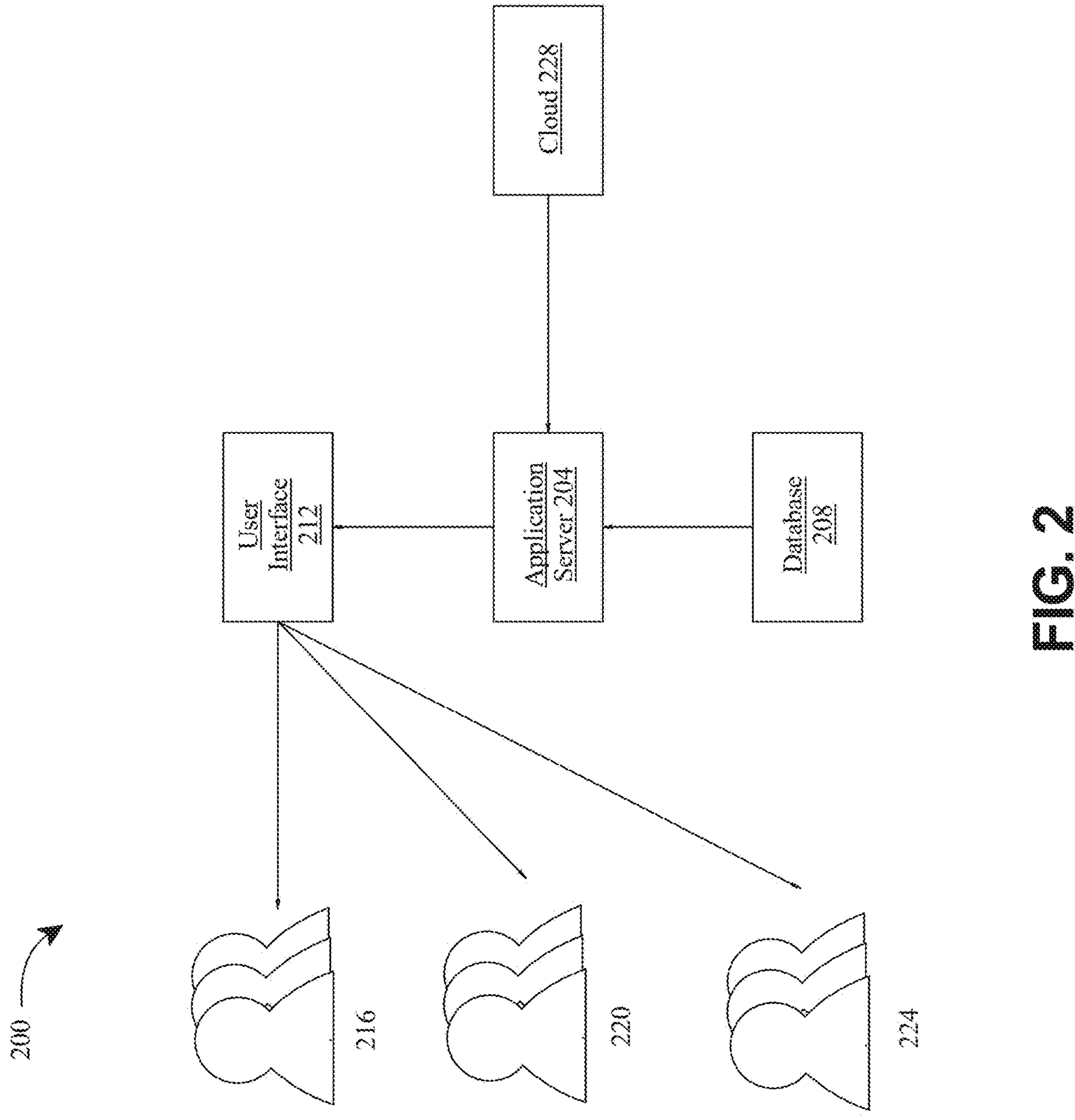
FIG. 2 illustrates a block diagram of an exemplary system for improving resource distribution by facilitating interconnected modules.

Referring now to FIG. 2, a block diagram of an exemplary system 200 for improving resource distribution by facilitating interconnected modules is illustrated. System 200 disclosed herein may be consistent with apparatus 100. System 200 may be a digital product with no physical structure. System 200 may include cloud-based software with the following technical components, central database system for storing all organizational, recipient, financial, inventory, and survey data, web application interface accessible using desktop browsers, mobile-optimized interface for smartphone and tablet access, secure user authentication and role-based access control system, cloud storage architecture for all data, API integrations for financial reporting and third-party services and automated notification system. Users may access system 200 through web browsers or mobile devices using secure login credentials. All data may be stored in the cloud, ensuring accessibility from any authorized device with internet connectivity. System 200 may include novel features including a unified platform integrating funding management, recipient tracking, inventory management, and survey distribution in a single system 200, dual-facing access allowing both administrators and funding recipients to interact with the system 200, comprehensive tracking of the entire funding distribution lifecycle within one platform, integrated survey and form creation and analysis tools specifically designed for funding organizations, cloud-based architecture enabling access across desktop and mobile devices, customizable reporting tools for analyzing funding impact and recipient outcomes, real-time updates and notifications for all system users, and direct recipient access to personal funding information through dedicated portals. In some cases, alternative implementations of system 200 may include, on-premises deployment instead of cloud-based hosting for organizations with specific security requirements, simplified version with reduced functionality for smaller organizations, enterprise version with additional features for large-scale funding operations, integration with blockchain technology for enhanced transparency in fund distribution, implementation as a mobile-first application rather than a primarily web-based system, development of dedicated desktop applications that sync with the cloud platform, development of data-based predictive outcome analyses for funding recipients.

With continued reference to FIG. 1, system 200 may include backend (application server 204), which processes application logic and connects directly to a database 208 containing various types of records, including client data, sober living home (SLH) records, scholarship details, check-in logs, and research data. The database 208 may be consistent with distribution database described with respect to FIG. 1. This backend may support a frontend web interface (user interface 212), which is accessed by three types of users: clients 216 (resource receivers), SLH managers (service providers 220), and charity administrators 224 (administering entities). The user interface 212 may be consistent with a user interface described with respect to FIG. 1. The clients 216, service providers 220 and charity administrators 224 may be consistent with resource receivers, administering entities, and users described with respect to FIG. 1, respectively. Each user role may interact with system 200 through the user interface 212 to perform tasks relevant to their function, such as submitting updates, managing housing data, or reviewing scholarship distributions. The backend may be hosted on a cloud 228, utilizing services such as EC2, RDS, S3, and IAM to support infrastructure scalability, secure data storage, and identity management. In some embodiments, application server 204 may be a part of cloud 228. In other embodiments, application server 204 may be external to cloud 228. This modular architecture may enable secure, role-specific access to critical data and ensure that the platform operates efficiently across multiple user types and administrative levels.

Figure 3A:
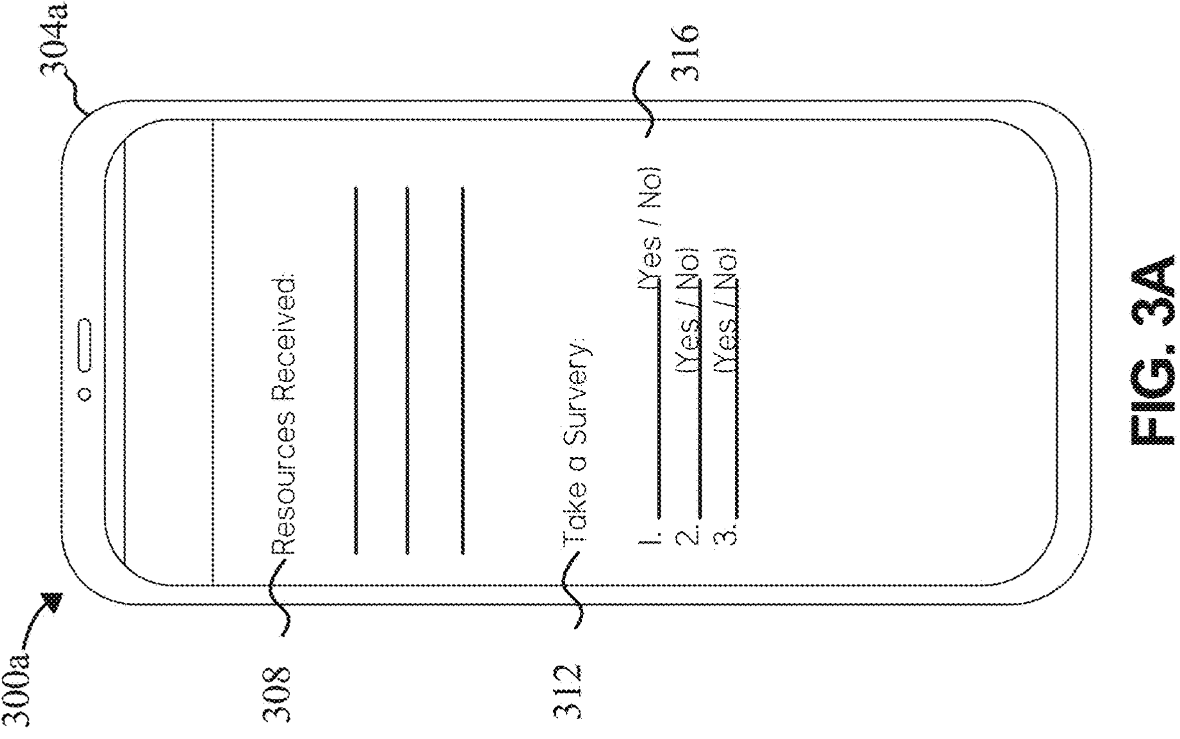
FIGS. 3A-B illustrate exemplary user interfaces.
Figure 3B:
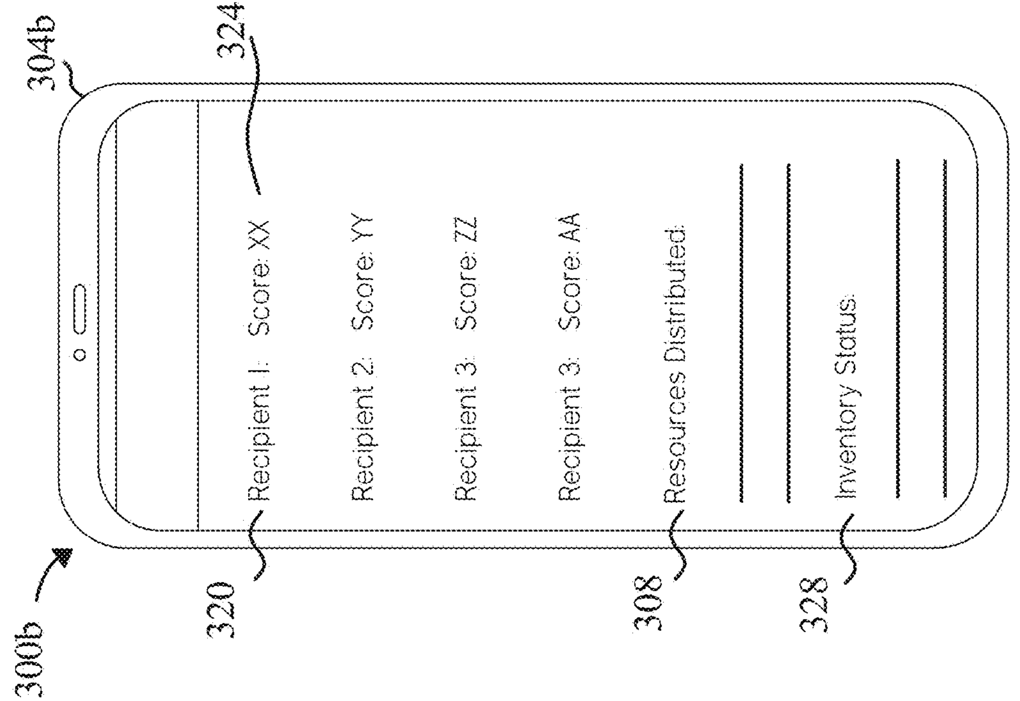

Referring now to FIGS. 3A-B, exemplary user interfaces 300*a-b* are illustrated. In some embodiments, user interfaces 300*a* may be displayed on an external device 304*a*. In some embodiments, user interface 300*a* may be configured for access and interaction by a resource receiver. In some embodiments, user interface 300*a* may include digital representation of output data 308, input collecting template 312, and the like. In a non-limiting example, user interface 300*a* may include graphical interface element 316, allowing a resource receiver to input a template input. In some embodiments, user interface 300*a* may include graphical interface elements designed to present personalized information such as funding status, upcoming tasks, form completion prompts, or survey responses. User interface 300*a* may allow a resource receiver to submit template input, receive distribution notifications, and interact with guidance materials or communication tools relevant to a distribution program.

With continued reference to FIGS. 3A-B, in some embodiments, user interfaces 300*b* may be displayed on an external device 304*b*. In some embodiments, user interface 300*b* may be configured for use by an administering entity. User interface 300*b* may include expanded functionalities and visual elements for reviewing input data profiles 320 of a plurality of resource receivers and distribution efficacy score 324 of each of the input data profiles 320, monitoring compliance metrics, accessing reporting and analytics features, and executing administrative controls over distribution workflows. In some embodiments, user interface 300*b* may include digital representation of output data 308 (e.g., summaries or detail of resource distribution for a plurality of resource receivers), resource status 328, and the like. In some embodiments, user interface 300*b* may include graphical summaries of resource allocation efficiency, recipient engagement indicators, and system-generated alerts associated with distribution decisions or policy thresholds. Each user interface may be customized according to an interface access level associated with the authenticated user.

Figure 4:
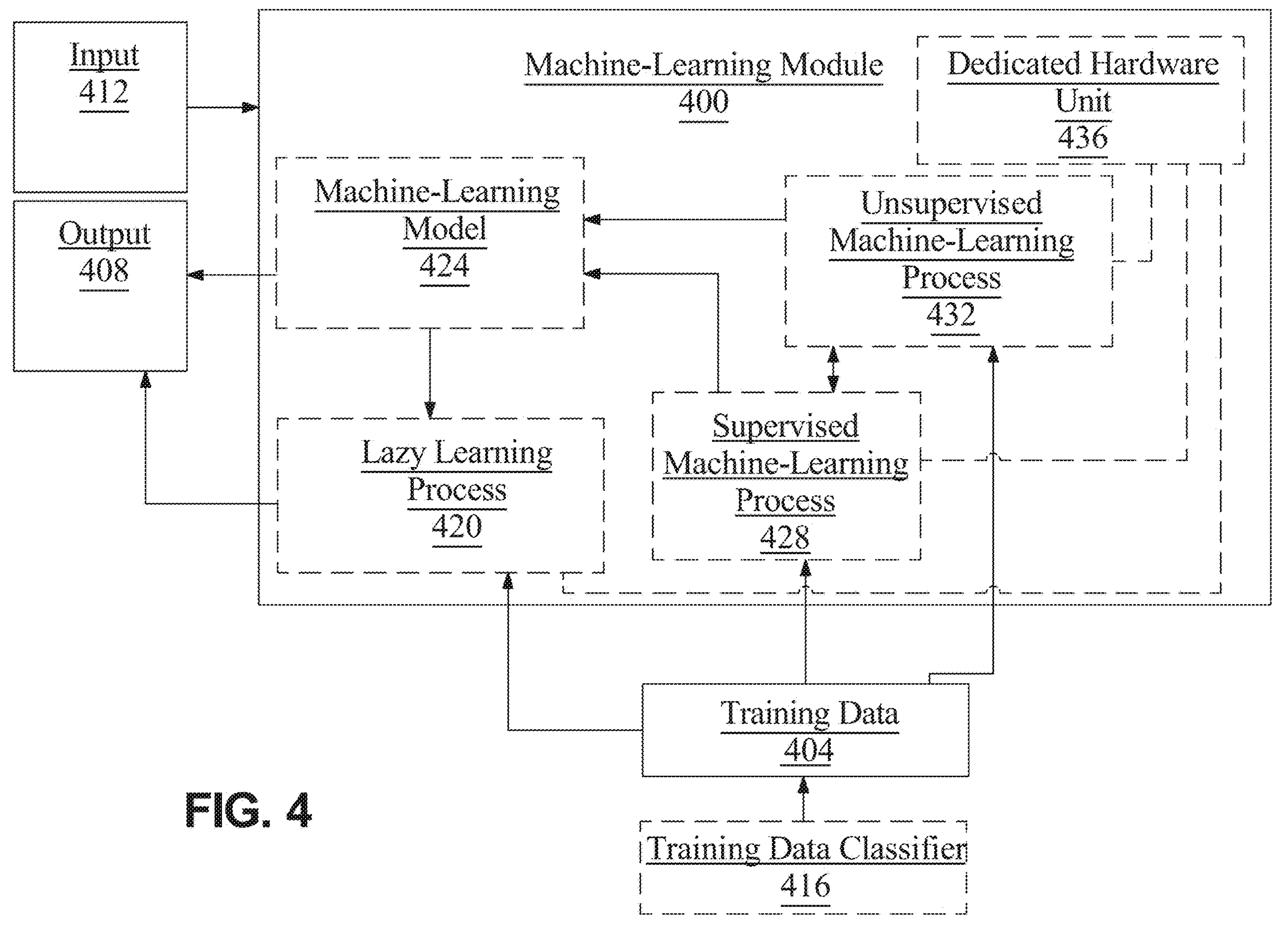
FIG. 4 illustrates a block diagram of an exemplary machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, input data may include input data, input feature, template input, output data, historical distribution data, input data profile, distribution efficacy score, resource status, historical output generation data, and the like. As a non-limiting illustrative example, output data may include input feature, distribution datum, output data, input data profile, distribution efficacy score, resource status, and the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to user cohort related to demographic information or distribution efficacy history of resource receiver, administering entity, user, and the like.

Still referring to FIG. 4, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l=\sqrt{\sum_{i=0}^{n}a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input data, input feature, template input, output data, historical distribution data, input data profile, distribution efficacy score, resource status, historical output generation data, and the like as described above as inputs, input feature, distribution datum, output data, input data profile, distribution efficacy score, resource status, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any current or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
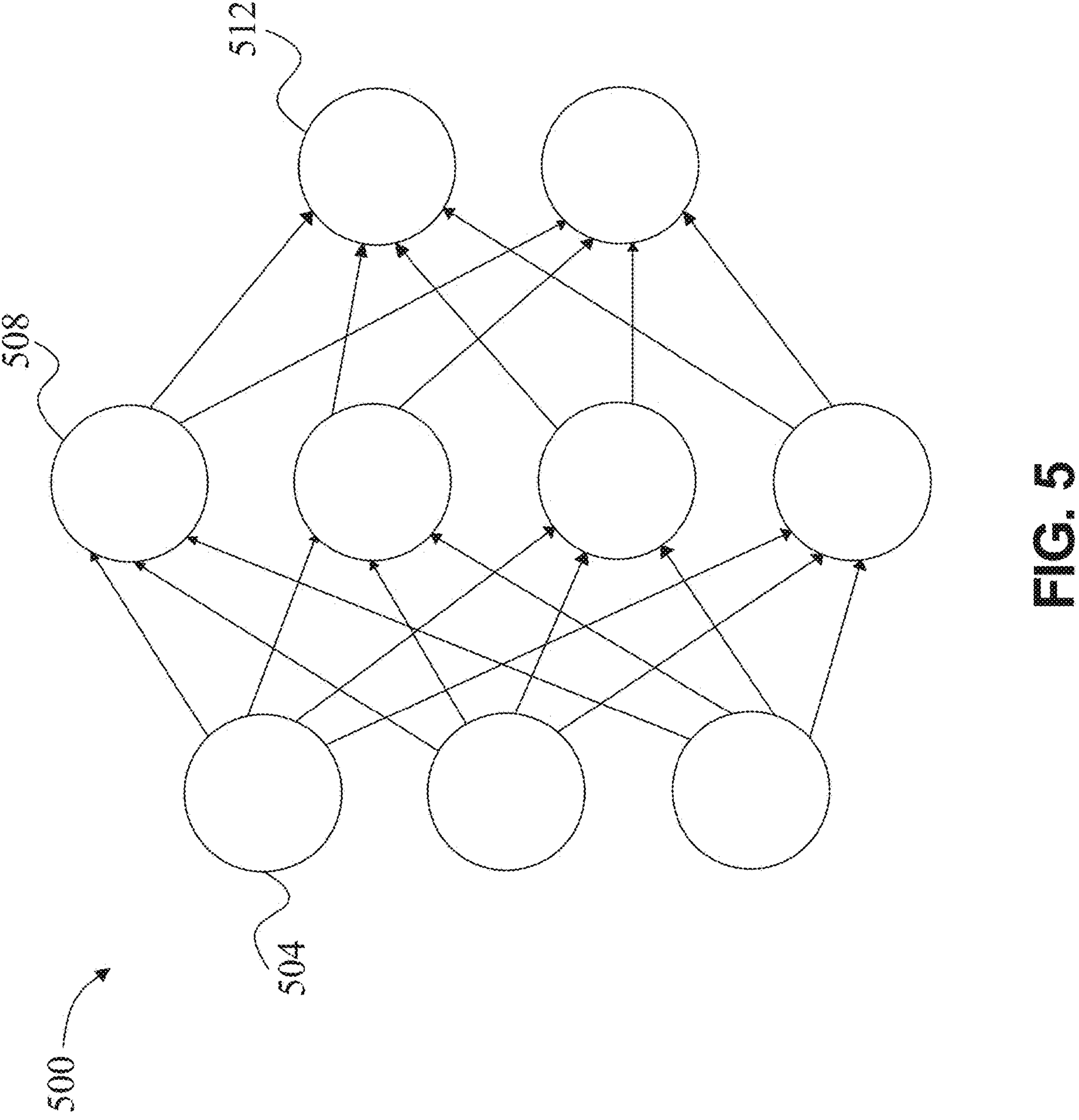
FIG. 5 illustrates a diagram of an exemplary neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
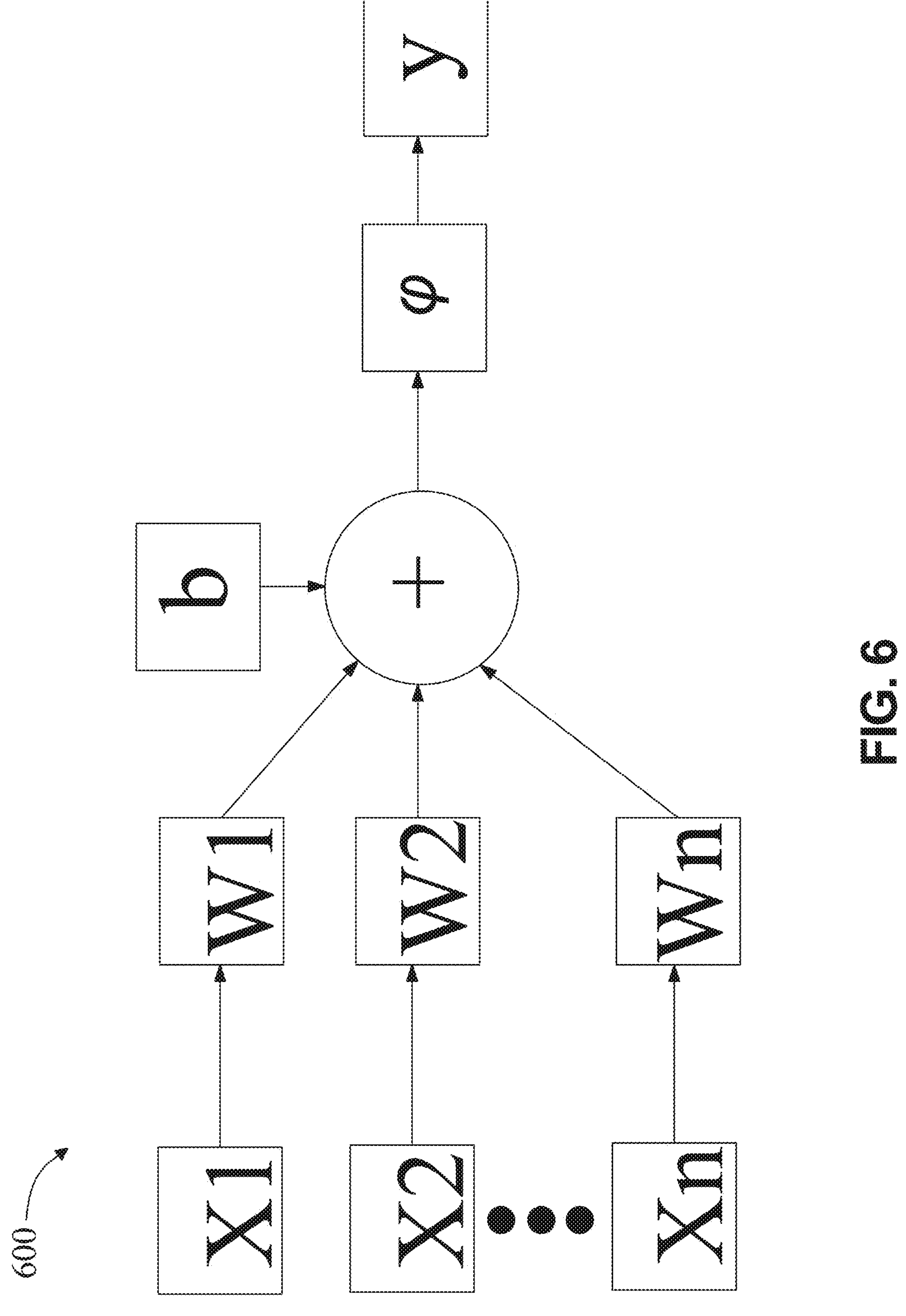
FIG. 6 illustrates a block diagram of an exemplary node in a neural network.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as f(x)=tan $h^2$(x), a rectified linear unit function such as f(x)=max(0,x), a "leaky" and/or "parametric" rectified linear unit function such as f(x)=max (ax,x) for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $$f(x) = a\left(1 + \tanh\left(\sqrt{2/\pi}(x + bx^r)\right)\right)$$

for some values of a, b, and r, and/or a scaled exponential linear unit function such as $$f(x) = \lambda\begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha\frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 7:
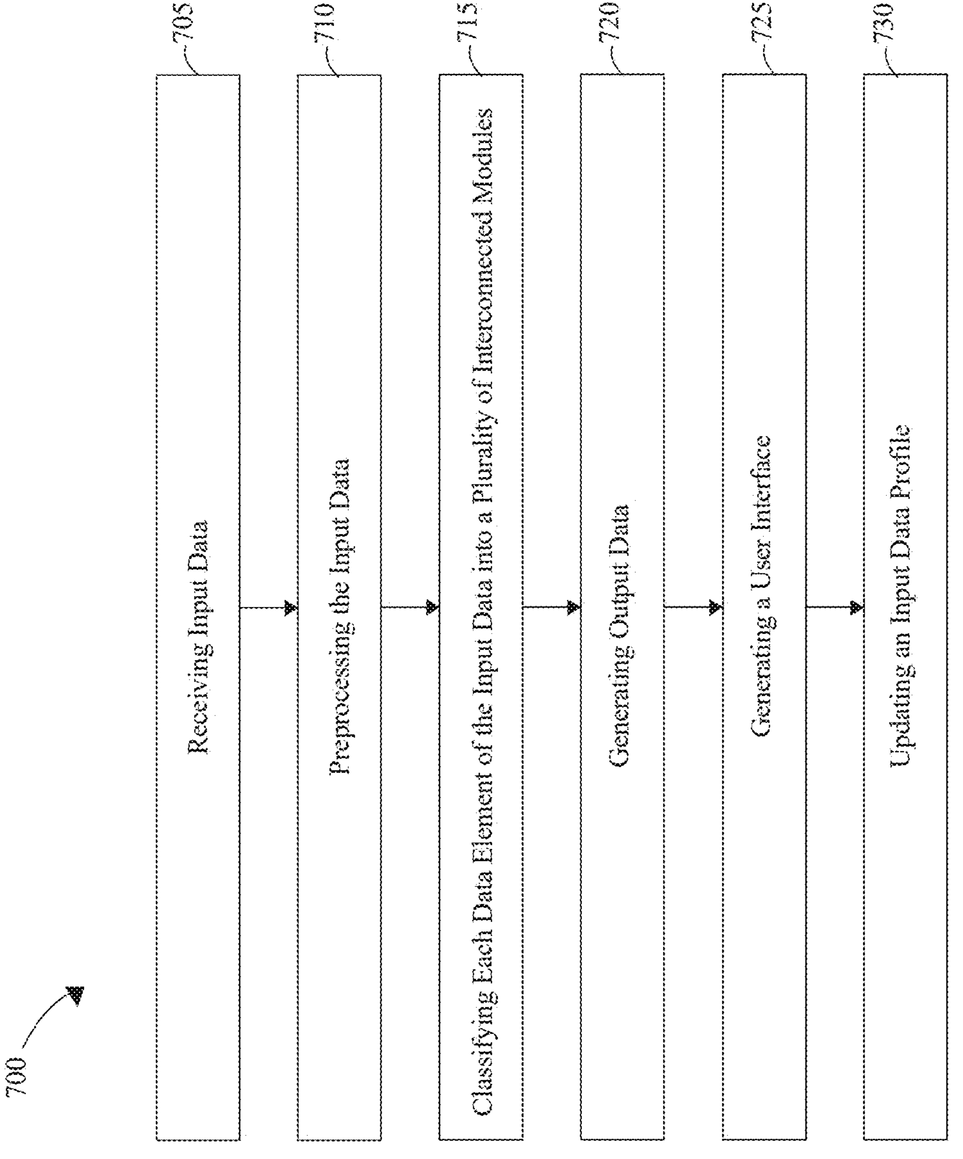
FIG. 7 illustrates a flow diagram of an exemplary method for improving resource distribution by facilitating interconnected modules.

Referring now to FIG. 7, a flow diagram of an exemplary method 700 for improving resource distribution by facilitating interconnected modules is illustrated. Method 700 contains a step 705 of receiving, using at least a processor, input data related to a resource distribution, wherein receiving the input data may include receiving at least a first portion of the input data at a first interval from a first data source and receiving at least a second portion of the input data at a second interval from a second data source. This may be implemented as reference to FIGS. 1-6.

With continued reference to FIG. 7, method 700 contains a step 710 of preprocessing, using at least a processor, input data to extract at least an input feature of the input data using a feature extraction process. This may be implemented as reference to FIGS. 1-6.

With continued reference to FIG. 7, method 700 contains a step 715 of classifying, using at least a processor, each data element of input data into a plurality of interconnected modules as a function of at least an input feature, wherein classifying each data element of the input data includes generating an input data profile, wherein the input data profile includes a set of data elements of the input data associated with a resource receiver. In some embodiments, generating the input data profile may include receiving application data of the at least a first portion of the input data continuously, receiving template data of the at least a second portion of the input data periodically and classifying each of the portions of the input data to the input data profile, wherein classifying comprises analyzing textual data in the application data and the template data using a natural language processing and optical character recognition. These may be implemented as reference to FIGS. 1-6.

With continued reference to FIG. 7, method 700 contains a step 720 of generating, using at least a processor and a plurality of interconnected modules, output data as a function of a classified data element of input data. In some embodiments, generating the output data may include generating a distribution efficacy score as a function of historical resource distribution data of the input data using a score machine-learning model of the plurality of interconnected modules and generating the output data as a function of the distribution efficacy score. In some embodiments, generating the distribution efficacy score may include generating the distribution efficacy score using a structured statistical distribution, wherein the structured statistical distribution may represent at least one confidence interval and a plurality of distribution probabilities associated with potential resource distributions. In some embodiments, generating the output data may include determining a resource status as a function of historical distribution data of the input data and generating the output data as a function of the resource status. In some embodiments, generating the output data may include generating a plurality of sets of model training data, wherein the plurality of sets of model training data may include historical output generation data training each of interconnected machine-learning models of the plurality of interconnected modules using each of the plurality of sets of model training data and generating the output data using the trained interconnected machine-learning models. These may be implemented as reference to FIGS. 1-6.

With continued reference to FIG. 7, method 700 contains a step 725 of generating, using at least a processor, a user interface including a digital representation of output data, wherein generating the user interface includes executing a distribution datum as a function of the output data. In some embodiments, generating the user interface may include receiving a receiver credential from an external device associated with the resource receiver assigning an interface access level as a function of the receiver credential and presenting at least a portion of the output data as a function of the interface access level. In some embodiments, generating the user interface may include generating a distribution report as a function of the input data and the output data using a language model. These may be implemented as reference to FIGS. 1-6.

With continued reference to FIG. 7, method 700 contains a step 730 of updating, using at least a processor, an input data profile as a function of an execution of a distribution datum. In some embodiments, updating the input data profile may include generating an input collecting template as a function of the at least an input feature executing the input collecting template at an external device associated with the resource receiver as a function of the input data profile receiving a template input for the executed input collecting template from the external device and updating the input data profile as a function of the template input. In some embodiments, updating the input data profile may include modifying the output data as a function of the template input by changing a designated resource receiver of the output data. These may be implemented as reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
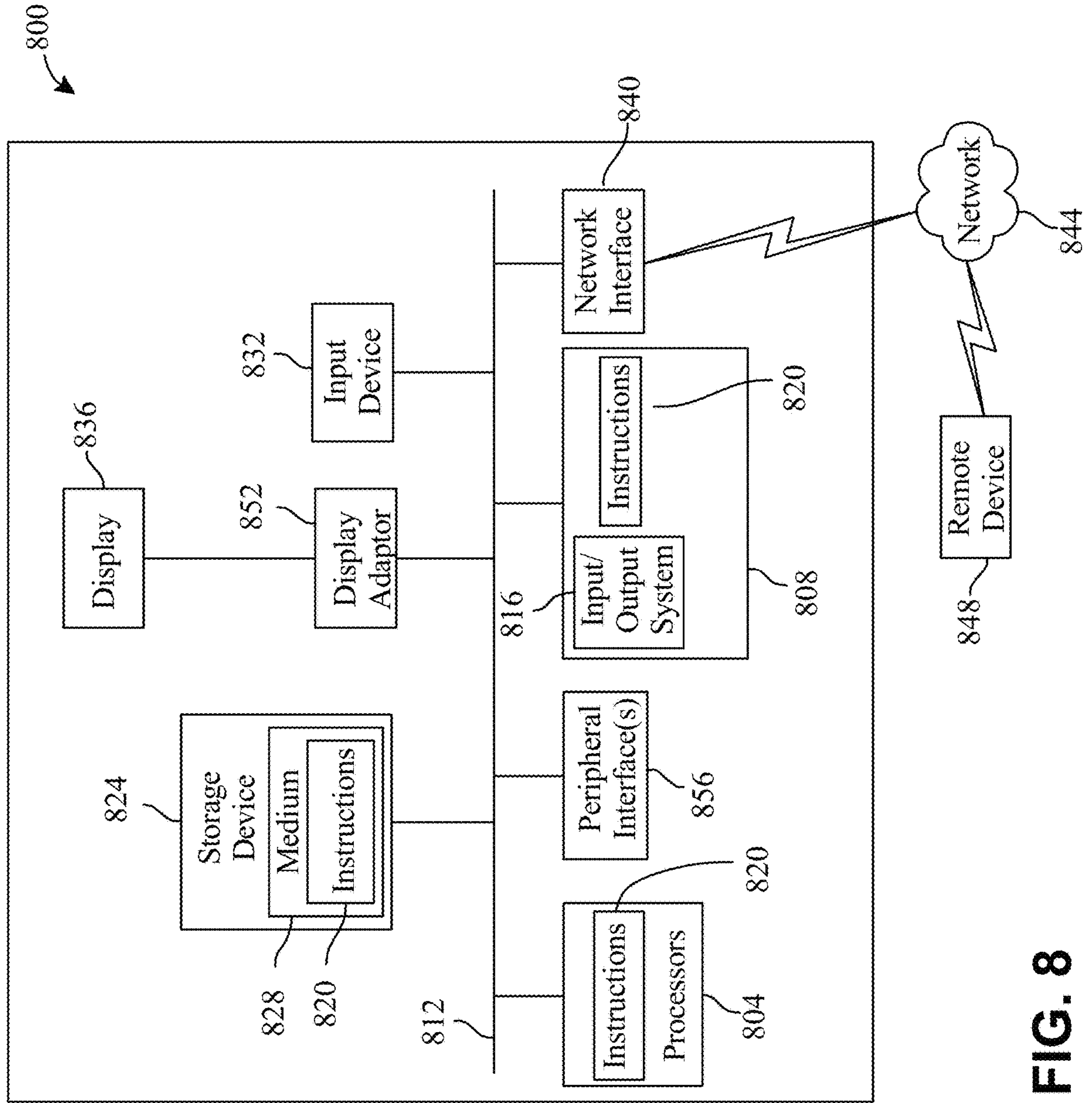
FIG. 8 illustrates a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicates with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof. Memory 808 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In some embodiments, storage device 824 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, an LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

Further referring to FIG. 8, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 8, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 8, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 800, processor 804, and memory 808 may be virtualized; that is, a virtual machine and/or container may interact directly with such computing system 800, processor 804, and/or memory 808, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 804 comprises a plurality of processors and/or processor cores, virtualization may, in some cases, simulate or emulate a single (virtual) processor whose functions are allocated to one or more of the plurality of processors and/or processor cores. In this case, while processor 804 may be said to be virtualized, the processor 804, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1)

QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for improving resource distribution by facilitating interconnected modules, the apparatus comprising:

at least a processor; and a memory communicatively connected to the at least a processor, wherein the memory contains instructions configuring the at least a processor to:

receive input data related to a resource distribution;

preprocess the input data to extract at least an input feature of the input data using a feature extraction process;

classify each data element of the input data into a plurality of interconnected modules as a function of the at least an input feature, wherein classifying each data element of the input data comprises:

generating an input data profile, wherein the input data profile comprises a set of data elements of the input data associated with a resource receiver;

generate, using the plurality of interconnected modules comprising a plurality of interconnected machine-learning models that have been trained with a plurality of sets of model training data, output data as a function of the classified data element of the input data, wherein generating the output data comprises:

modifying at least one set of the plurality of sets of model training data by classifying elements of the at least one set of the plurality of sets of model training data to one or more user cohorts related to distribution efficacy history of the resource receiver;

retraining at least one model of the plurality of interconnected machine-learning models using the at least one modified set of the plurality of sets of model training data; and generating the output data using the at least one retrained model of the plurality of retrained interconnected machine-learning models;

generate a user interface comprising a digital representation of the output data, wherein generating the user interface comprises executing a distribution datum as a function of the output data; and update the input data profile as a function of the execution of the distribution datum.

2. The apparatus of claim 1, wherein generating the output data comprises:

generating a distribution efficacy score as a function of historical resource distribution data of the input data using a score machine-learning model of the plurality of interconnected modules; and generating the output data as a function of the distribution efficacy score.

3. The apparatus of claim 2, wherein generating the distribution efficacy score comprises generating the distribution efficacy score using a structured statistical distribution, wherein the structured statistical distribution represents at least one confidence interval and a plurality of distribution probabilities associated with potential resource distributions.

4. The apparatus of claim 1, wherein generating the output data comprises:

determining a resource status as a function of historical distribution data of the input data; and generating the output data as a function of the resource status.

5. The apparatus of claim 1, wherein generating the output data comprises:

generating a plurality of sets of model training data, wherein the plurality of sets of model training data comprises historical output generation data;

training each of interconnected machine-learning models of the plurality of interconnected modules using each of the plurality of sets of model training data; and generating the output data using the trained interconnected machine-learning models.

6. The apparatus of claim 1, wherein generating the user interface comprises:

receiving a receiver credential from an external device associated with the resource receiver;

assigning an interface access level as a function of the receiver credential; and presenting at least a portion of the output data as a function of the interface access level.

7. The apparatus of claim 1, wherein generating the user interface comprises generating a distribution report as a function of the input data and the output data using a language model.

8. The apparatus of claim 1, wherein generating the input data profile comprises:

receiving application data of at least a first portion of the input data at a first interval;

receiving template data of at least a second portion of the input data at second interval, wherein the first interval is longer than the second interval;

classifying the at least a first portion of the input data to a first neural network configured for features associated with the first interval;

classifying the at least a second portion of the input data to a second neural network configured for features associated with the second interval; and analyzing textual data in the application data and the template data using the first and second neural networks respectively to generate the input data profile.

9. The apparatus of claim 1, wherein updating the input data profile comprises:

generating an input collecting template as a function of the at least an input feature;

executing the input collecting template at an external device associated with the resource receiver as a function of the input data profile;

receiving a template input for the executed input collecting template from the external device; and updating the input data profile as a function of the template input.

10. The apparatus of claim 9, wherein updating the input data profile comprises modifying the output data as a function of the template input by changing a designated resource receiver of the output data.

11. A method for improving resource distribution by facilitating interconnected modules, the method comprising:

receiving, using at least a processor, input data related to a resource distribution preprocessing, using the at least a processor, the input data to extract at least an input feature of the input data using a feature extraction process;

classifying, using the at least a processor, each data element of the input data into a plurality of interconnected modules as a function of the at least an input feature, wherein classifying each data element of the input data comprises:

generating an input data profile, wherein the input data profile comprises a set of data elements of the input data associated with a resource receiver;

generating, using the at least a processor and the plurality of interconnected modules comprising a plurality of interconnected machine-learning models that have been trained with a plurality of sets of model training data, output data as a function of the classified data element of the input data, wherein generating the output data comprises:

modifying at least one set of the plurality of sets of model training data by classifying elements of the at least one set of the plurality of sets of model training data to one or more user cohorts related to distribution efficacy history of the resource receiver:

retraining at least one model of the plurality of interconnected machine-learning models using the at least one modified set of the plurality of sets of model training data; and generating the output data using the at least one retrained model of the plurality of retrained interconnected machine-learning models;

generating, using the at least a processor, a user interface comprising a digital representation of the output data, wherein generating the user interface comprises executing a distribution datum as a function of the output data; and updating, using the at least a processor, the input data profile as a function of the execution of the distribution datum.

12. The method of claim 11, wherein generating the output data comprises:

generating a distribution efficacy score as a function of historical resource distribution data of the input data using a score machine-learning model of the plurality of interconnected modules; and generating the output data as a function of the distribution efficacy score.

13. The method of claim 12, wherein generating the distribution efficacy score comprises generating the distribution efficacy score using a structured statistical distribution, wherein the structured statistical distribution represents at least one confidence interval and a plurality of distribution probabilities associated with potential resource distributions.

14. The method of claim 11, wherein generating the output data comprises:

determining a resource status as a function of historical distribution data of the input data; and generating the output data as a function of the resource status.

15. The method of claim 11, wherein generating the output data comprises:

generating a plurality of sets of model training data, wherein the plurality of sets of model training data comprises historical output generation data;

training each of interconnected machine-learning models of the plurality of interconnected modules using each of the plurality of sets of model training data; and generating the output data using the trained interconnected machine-learning models.

16. The method of claim 11, wherein generating the user interface comprises:

receiving a receiver credential from an external device associated with the resource receiver;

assigning an interface access level as a function of the receiver credential; and presenting at least a portion of the output data as a function of the interface access level.

17. The method of claim 11, wherein generating the user interface comprises generating a distribution report as a function of the input data and the output data using a language model.

18. The method of claim 11, wherein generating the input data profile comprises:

receiving application data of at least a first portion of the input data at a first interval;

receiving template data of at least a second portion of the input data at a second interval, wherein the first interval is longer than the second interval;

classifying the at least a first portion of the input data to a first neural network configured for features associated with the first interval;

classifying the at least a second portion of the input data to a second neural network configured for features associated with the second interval; and analyzing textual data in the application data and the template data using the first and second neural networks respectively to generate the input data profile.

19. The method of claim 11, wherein updating the input data profile comprises:

generating an input collecting template as a function of the at least an input feature;

executing the input collecting template at an external device associated with the resource receiver as a function of the input data profile;

receiving a template input for the executed input collecting template from the external device; and updating the input data profile as a function of the template input.

20. The method of claim 19, wherein updating the input data profile comprises modifying the output data as a function of the template input by changing a designated resource receiver of the output data.

* * * * *